US010579285B2

(12) United States Patent
Rooney et al.

(10) Patent No.: US 10,579,285 B2
(45) Date of Patent: Mar. 3, 2020

(54) AUTOMATIC DATA HEALING BY I/O

(71) Applicant: International Business Machines Corporation, Armonk, NY (US)

(72) Inventors: William J. Rooney, Hopewell Junction, NY (US); Carol S. Mellgren, Tucson, AZ (US); David R. Blea, Round Rock, TX (US); Gregory E. McBride, Vail, AZ (US); Dale F. Riedy, Poughkeepsie, NY (US); Tabor R. Powelson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 15/890,522

(22) Filed: Feb. 7, 2018

(65) Prior Publication Data
US 2019/0243562 A1 Aug. 8, 2019

(51) Int. Cl.
*G06F 3/00* (2006.01)
*G06F 3/06* (2006.01)

(52) U.S. Cl.
CPC .......... *G06F 3/0619* (2013.01); *G06F 3/0653* (2013.01); *G06F 3/0683* (2013.01); *G06F 2201/82* (2013.01)

(58) Field of Classification Search
CPC ..... G06F 3/0619; G06F 3/0653; G06F 3/0683
See application file for complete search history.

(56) References Cited

U.S. PATENT DOCUMENTS

| 5,596,709 A * | 1/1997 | Bond ................ G06F 11/1084 714/6.32 |
|---|---|---|
| 6,480,970 B1 | 11/2002 | DeKoning et al. |
| 7,085,956 B2 | 8/2006 | Petersen et al. |
| 7,117,386 B2 | 10/2006 | LeCrone et al. |
| 7,120,824 B2 | 10/2006 | Burton et al. |
| 7,152,078 B2 | 12/2006 | Yamagami |
| 7,185,222 B2 | 2/2007 | Burton et al. |
| 7,188,272 B2 | 3/2007 | Bartfai et al. |
| 7,793,148 B2 | 9/2010 | Beardsley et al. |
| 8,005,800 B2 | 8/2011 | Spear et al. |
| 8,010,758 B1 | 8/2011 | Bezbaruah et al. |
| 8,316,196 B1 | 11/2012 | Mullis et al. |
| 8,595,185 B2 | 11/2013 | Hayardeny et al. |

(Continued)

OTHER PUBLICATIONS

Blea et al., "Managing Health Conditions to Determine When to Restart Replication After a Swap Triggered by a Storage Health Event," U.S. Appl. No. 15/187369, filed Jun. 20, 2016, .

(Continued)

*Primary Examiner* — Katherine Lin
(74) *Attorney, Agent, or Firm* — Robert J. Shatto

(57) ABSTRACT

Provided is a method for correcting untrusted data and avoiding logical device swapping for at least one logical subsystem of at least one computer system. A processor may monitor a primary storage for one or more errors that indicate untrusted data on the primary storage. An error indicating that a data set on the primary storage is an untrusted data set may be identified. In response to the error being identified, a corresponding uncompromised version of the data set may be read from a secondary storage. The corresponding uncompromised version of the data set may be written over the untrusted data set on the primary storage.

16 Claims, 14 Drawing Sheets

(56) References Cited

U.S. PATENT DOCUMENTS

| | | |
|---|---|---|
| 8,793,456 B2 | 7/2014 | Blea et al. |
| 8,799,602 B2 | 8/2014 | Blea et al. |
| 8,914,671 B2 | 12/2014 | Rooney et al. |
| 9,032,172 B2 | 5/2015 | Johnson et al. |
| 9,052,833 B2 | 6/2015 | Petersen et al. |
| 9,052,990 B2 | 6/2015 | Maria Joseph et al. |
| 9,092,449 B2 | 7/2015 | Brown et al. |
| 9,405,628 B2 | 8/2016 | Blea et al. |
| 9,514,013 B2 | 12/2016 | Hatfield |
| 9,535,840 B2 | 1/2017 | Chambliss et al. |
| 9,703,619 B2 | 7/2017 | Andre et al. |
| 10,013,306 B2 | 7/2018 | Umbehocker et al. |
| 2004/0024961 A1* | 2/2004 | Cochran ............... G06F 3/0617 711/112 |
| 2008/0172572 A1 | 7/2008 | Beardsley et al. |
| 2014/0372672 A1 | 12/2014 | Lokare et al. |
| 2015/0088821 A1 | 3/2015 | Blea et al. |
| 2015/0212733 A1 | 7/2015 | Li et al. |
| 2015/0227469 A1 | 8/2015 | Zyulkyarov et al. |
| 2015/0281015 A1 | 10/2015 | Griffith et al. |
| 2015/0286545 A1 | 10/2015 | Brown et al. |
| 2015/0347245 A1 | 12/2015 | Andre et al. |
| 2015/0347252 A1 | 12/2015 | Andre et al. |
| 2015/0370659 A1 | 12/2015 | Pershin et al. |
| 2016/0042762 A1 | 2/2016 | Joshi et al. |
| 2016/0092322 A1 | 3/2016 | Nosov et al. |
| 2016/0328303 A1 | 11/2016 | Brandner et al. |
| 2016/0342357 A1 | 11/2016 | Ramamoorthy et al. |
| 2016/0378625 A1 | 12/2016 | Aizer et al. |
| 2017/0116071 A1 | 4/2017 | Arroyo et al. |
| 2017/0212813 A1 | 7/2017 | Hadas et al. |
| 2018/0357140 A1 | 12/2018 | Xiang et al. |
| 2019/0004888 A1 | 1/2019 | Chagam Reddy |
| 2019/0004894 A1 | 1/2019 | Chagam Reddy et al. |

OTHER PUBLICATIONS

Blea et al., "After Swapping From a First Storage to a Second Storage, Mirroring Data From the Second Storage to the First Storage for Data in the First Storage That Experienced Data Errors," U.S. Appl. No. 15/187,388, filed Jun. 20, 2016.

Rooney et al., "Automatic Data Healing Using a Storage Controller," U.S. Appl. No. 15/890,508, filed Feb. 7, 2018.

List of IBM Patents or Patent Applications Treated as Related, Jan. 25, 2018, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

W. Bauer, et al., "IBM DS8000 and z/Os Basic HyperSwap", IBM Corporation, Redpaper, 2008, pp. 38.

K. Orlando, et al., "Introducing and Implementing IBM FlashSystem V9000", IBM Corporation, Redbooks, Document SG24-8273-01, Oct. 2015, pp. 598.

J. Tate, et al., "IBM Storwize V7000, Spectrum Virtualize, HyperSwap, and VMware Implementation", IBM Corporation, Redbooks, Document SG24-8317-00, Nov. 2015, pp. 176.

\* cited by examiner

AUTOMATIC DATA HEALING BY I/O

BACKGROUND

The present disclosure relates generally to the field of data storage, and more particularly to data recovery and preventing data storage loss.

HyperSwap (e.g., logical device swapping) is a function provided by IBM's z/OS operating system. An event which causes a logical device swap to be initiated is called a swap trigger. Logical device swapping provides continuous availability of data when disk failures occur by maintaining synchronous copies of all primary volumes on one or more secondary volumes. When a disk failure is detected, code in the operating system identifies volumes managed with logical device swapping and instead of failing the I/O request, the system switches (e.g., or swaps) information in internal control blocks so that the I/O request is driven against the secondary volume of the synchronous copy. Since the secondary volume is an identical copy of the primary volume prior to the failure, the I/O request will succeed with no impact on the issuing program. The disk failure is therefore masked from the program and avoids application and system outages.

SUMMARY

Embodiments of the present disclosure include a method, computer program product, and system for correcting untrusted data and avoiding logical device swapping for at least one logical subsystem of at least one computer system. A processor may monitor a primary storage for one or more errors that indicate untrusted data on the primary storage. An error indicating that a data set on the primary storage is an untrusted data set may be identified. In response to the error being identified, a corresponding uncompromised version of the data set may be read from a secondary storage. The corresponding uncompromised version of the data set may be written over the untrusted data set on the primary storage.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
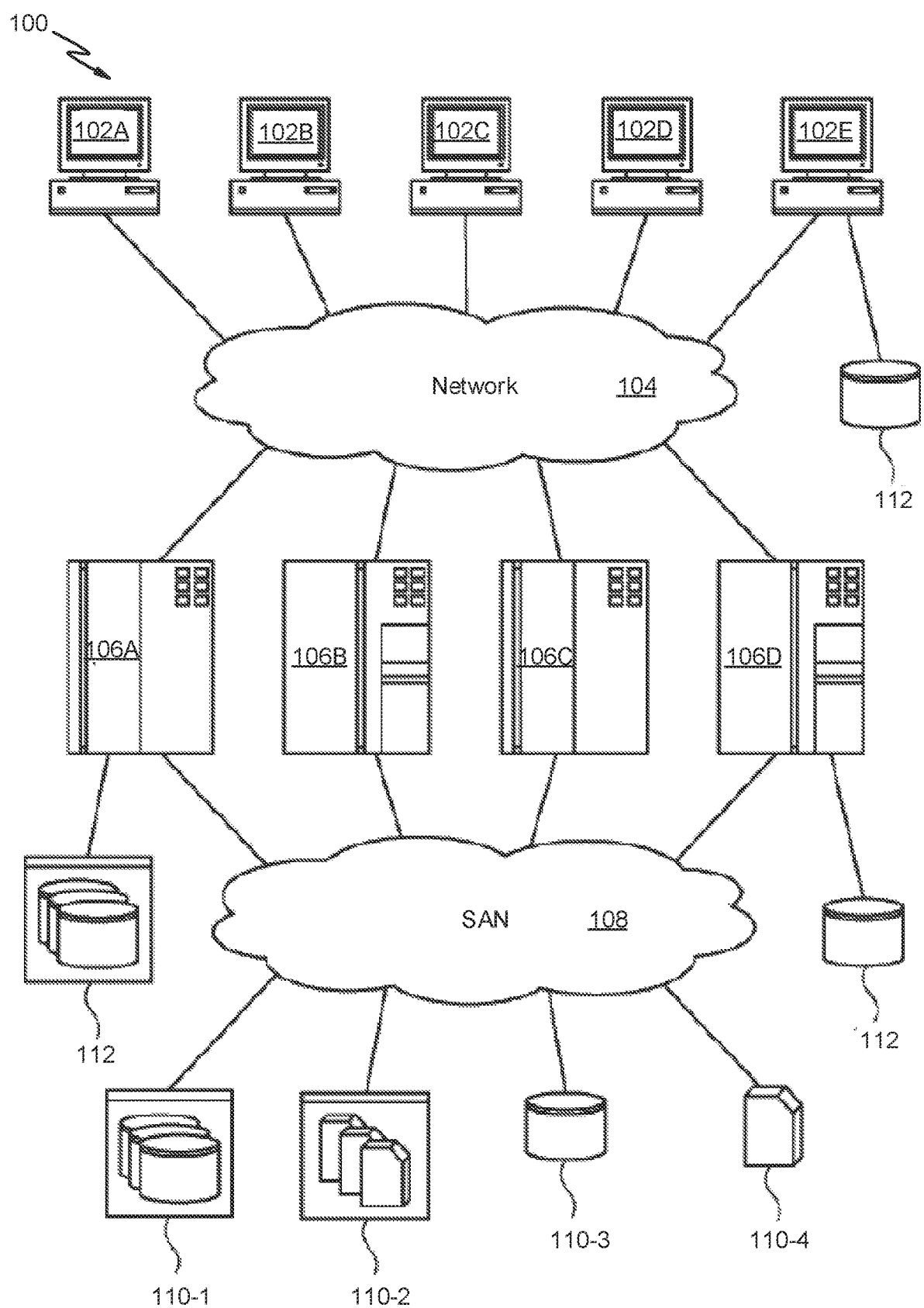
FIG. 1 illustrates an example network architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data storage, and more particularly to data recovery and preventing data storage loss. While the present disclosure is not necessarily limited to such applications, various aspects of the disclosure may be appreciated through a discussion of various examples using this context.

System storage controllers can raise signals to alert the host of certain error conditions. These signals, in a storage controller context, are referred to as storage controller health messages. For example, these signals can be raised during controller recovery actions, internal control block rebuild actions, or severe error conditions. These types of conditions generally indicate that the controller either cannot service I/O requests or will be delayed in servicing I/O requests. For temporary conditions, additional storage controller health messages may be raised to signal the condition being resolved.

Peer-to-Peer Dynamic Address Switching (P/DAS) is a z/OS operating system function based on Dynamic Device Reconfiguration (DDR) and Peer-to-Peer Remote Copy (PPRC). It provides a means for installations to non-disruptively switch between devices in a synchronous pair when the primary storage needs to be made unavailable for reasons such as performing service or migrating from one subsystem to another. A synchronous pair is a pair of storage devices that maintain an identical copy of each other, such as a first storage 220a and second storage 220b that are synced together in order to retain the identical data. With P/DAS, a device is released (e.g., not actively reserved) prior to P/DAS's execution of operations on the device. P/DAS performs various operations serially (e.g., operates on one device at a time) in order to manage the PPRC state of a set of devices.

When a geographically dispersed logical subsystem can be utilized by an enterprise, a common solution for completing P/DAS functions is to suspend or terminate the applications requiring I/O access to data stored on the devices, perform operations including breaking the PPRC connections among the devices, and restart the applications. Consequently, the application's I/O access requests can be redirected to the secondary volumes. These operations can be approximately fifteen seconds per device, plus one to two additional seconds for each system comprising the cluster. As a result, several thousand PPRC pairs, for example, will exceed the maximum amount of allotted time for continuous availability system requirements. In some embodiments, P/DAS automates routines to provide multi-system serialization via an operator command in order to provide a synchronization point for all systems to switch devices at the same time in order to ensure data consistency.

When HyperSwap (e.g., logical device swapping) is enabled and certain types of storage controller health messages are received, logical device swapping will react to the health message as a swap trigger and initiate a logical device swap. A swap trigger is an event which causes a logical device swap to be initiated. When a logical device swap is triggered, the result is that the operating system and applications are configured to begin running on what was formerly the secondary storage. Likewise, in a data storage system, a logical device swap would "swap" between a primary storage device and a secondary storage device in a synchronous pair of data storage devices.

For example, in the event of an executed logical device swap, the secondary storage device would become the primary storage device and the primary storage device would become the secondary storage device. Following the swap, the new secondary storage device would form a synchronous relationship (e.g., synchronous mirroring) of the primary storage device in preparation for a future need to do another logical device swap. The logical device swap includes breaking the synchronous relationship, (e.g., the primary and secondary storage are no longer identical copies of each other). The synchronous relationship is broken because when a secondary storage is logically swapped to become the primary storage, the primary storage becomes the secondary storage, and until the new secondary storage is synchronized with the new primary storage, the relationship is broken. After the primary and secondary storage are synchronized, the synchronous relationship is reestablished. For example, a synchronous relationship is established when a processor issues a command to the storage requesting it to maintain the secondary storage as a copy of the primary storage.

Current storage controller processing, such as logical device swapping, relies on operator (e.g., a user, a manager, etc.) intervention to re-enable the synchronous mirroring from the new primary storage to the original primary storage that becomes the secondary storage. In some embodiments, it may be the responsibility of the operator to determine what the error was that triggered the logical device swapping and when it has been resolved. Once it has been resolved, they can then issue a command, which may restart replication in the reverse direction (e.g., from the new primary storage device(s) to the new secondary storage(s)). Until the operator initiates copying back to the old primary storage device (e.g., synchronous mirroring), there is no protection against a subsequent storage controller failure on the new primary storage device.

Some embodiments provide a method to fix the problem and avoid initiating a logical device swapping entirely. For example, in some embodiments, the data track on the primary storage that includes the error can be swapped with the corresponding data track on a mirrored secondary storage.

Some embodiments can eliminate the delay to critical applications during the logical device swap and can also reduce the time during which the systems are exposed to a subsequent storage failure. For example, simply identifying and copying a specific data track to a storage medium that includes the error can take much less time than synchronizing a full storage device volume. In some embodiments, a logical track copy can be performed instead of a logical device swap. For example, logical track copies can include the writing over of pinned data tracks on the first storage 220a with the unpinned counterpart data tracks on the second storage 220b. In some embodiments, pinned data (also referred to herein as "untrusted data") includes data that is not trusted (e.g., data that has questionable integrity or is known to be bad). In some embodiments, a pinned data track is a data track that has been flagged with an error that indicates a failed I/O request. In some embodiments, the error can indicate the presence of pinned data in a data track. In some embodiments, the process can lock the data track including the pinned data until the error indicating pinned data is resolved. When the error is resolved, the data can be unpinned and the data track can be unlocked. In some embodiments the I/O request can be a read request, a write request, a copy request, and/or any other type of I/O request.

In some embodiments, data with questionable integrity can include potentially corrupted data, data that fails a checksum, or a data track including data with an error identified during a consistency check or disk scrubbing. During a consistency check or disk scrubbing, tracks on a storage are checked for errors. Similarly, errors may be identified during an I/O operation. One such error is a unit check. In some embodiments, a unit check is returned by the storage system to the operating system (specifically the I/O supervisor), when a read or a write is issued to the storage system, and the storage system then realizes there is a problem. In some embodiments, the unit check can indicate pinned data. In some embodiments, the unit check is configured to return when an I/O error is detected while the system is reading a storage device. In some embodiments, a unit check can also include sense data. Sense data can include data related to the unsuccessful I/O completion. In some embodiments, pinned data can be defined as a data track identified in the sense data in the unit check. Sense data can include information that indicates what type of problem has occurred in a particular unit check error. For example, sense data can indicate that a failed I/O request has occurred at a data track.

FIG. 1 illustrates an example network architecture 100, according to embodiments. In some embodiments, the network architecture 100 may include the data storage network 200 of FIG. 2. The network architecture 100 is presented only by way of example and is not intended to be limiting. The systems and methods disclosed herein may be applicable to a wide variety of different computers, servers, storage devices, and network architectures, in addition to the network architecture 100 shown.

As shown, the network architecture 100 includes one or more computers 102A, 102B, 102C, 102D, 102E, collectively computer 102, interconnected together by a network 104 (e.g., the network 250 of FIG. 2) with one or more server computers 106A, 106B, 106C, 106D, collectively server computer 106. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host device"). In some embodiments, the server computers 106 may be the host device 232 of FIG. 2. In general, client computers 102 may initiate communication sessions (e.g., for transactions), whereas server computers 106 may wait for requests from the client computers 102. In certain embodiments, the computers 102 and/or server computers 106 may connect to one or more internal or external attached storage systems 112 (e.g., arrays of hard-disk drives, solid-state drives, tape drives, etc.). Computers 102 and 106, and direct-attached storage system 112 may communicate using protocols such as ATA, SATA, SCSI, SAS, Fibre Channel, or the like. One or more arrays of the storage system 112 may contain storage pools that may benefit from management techniques of the disclosure. In some embodiments, storage 110 can be first storage 220a, second storage 220b.

The network architecture 100 may, in certain embodiments, include a storage-area-network (SAN) 108 which is accessed through the server computers 106. In some embodiments, the SAN 108 may be the data storage network 200 of FIG. 2. The SAN 108 may connect the servers 106 to one or more storages (e.g., the primary and second storage 220a and 220b of FIG. 2), such as arrays 110-1 of hard-disk drives or solid-state drives, tape libraries 110-2, individual hard-disk drives 110-3 or solid-state drives 110-3, tape drives 110-4, (collectively storage 110) CD-ROM libraries, or the like. A connection may be through a switch, fabric, direct connection, or the like.

In certain embodiments, the servers 106 and storage 110 may communicate using a networking standard such as Fibre Channel (FC). In some embodiments, a connection may occur over SAN 108. One or more of the storages 110 may contain storage pools that may benefit from management techniques according to the disclosure.

For example, in some embodiments a server computer 106 may communicate over physical connections from one or more ports on the server computer 106, to one or more ports on the storages 110. In some embodiments, the storages 110 can be a single storage. In some embodiments, the plurality of storages 110 can be dispersed over a geographical area. In some embodiments, redundancy can exist such as when the storages 110 are a plurality of storages, which can be configured in a synchronous relationship, for example.

In some embodiments, the server computer 106 can be configured to attempt to retrieve data from a primary storage, and when the primary storage 110 returns an error indicating pinned data when attempting to retrieve data from the primary storage, a secondary storage is accessed. Since the primary and secondary storages exist as a synchronous pair, their data is synchronized and may be effectively identical (e.g., with a slight time delay), and in the event that a data error is detected on the primary storage, the secondary storage can be relied on for an error free version of the same data. In some embodiments, the time delay on storage node synchronization can be any time delay such as 0.1 seconds, 0.5 seconds, 1 second, 10 seconds, 60 seconds, or any other time delay. In some embodiments, the time delay can be a configured time delay. In some embodiments, the time delay can be a technological limitation (e.g., data may be pushed to the secondary storage after it has been successfully added to the primary storage, both of which take time). In some embodiments, pinned data can be detected following a consistency check or disk scrub operation. In some embodiments, the pinned data can be found following the receipt of an I/O error, a unit check error, and/or any other error that might indicate a failed read, write, or copy request, or confirmation of completion of the request that indicates pinned data. In some embodiments, the I/O error can indicate pinned data. In some embodiments, the I/O error can include information that can be used to identify the data track(s) that includes the pinned data. Pinned data can include data that the storage controller cannot retrieve from the system because of hardware failures. This plurality of storage nodes is further shown in FIG. 2 below.

Figure 2:
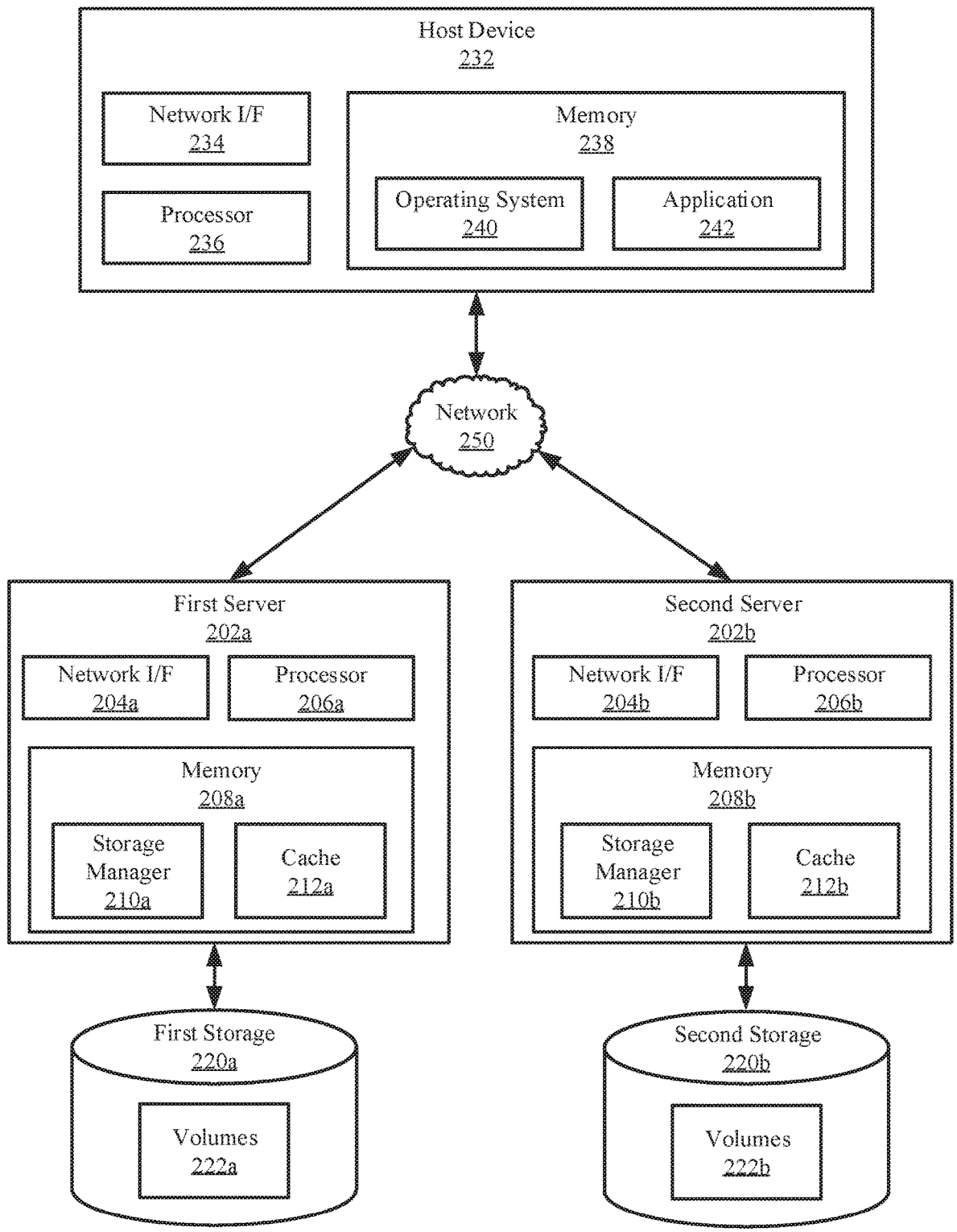
FIG. 2 illustrates an example storage system, in accordance with embodiments of the present disclosure.

Referring now to FIG. 2, illustrated is a block diagram of an example representation of a data storage network 200 for storing host data. The data storage network 200 includes a host device 232, a first storage server 202a connected to a first (e.g., primary) storage 220a, and a second storage server 202b connected to a second (e.g., secondary) storage 220b. The host device 232 is communicatively coupled with the first and second servers 202a, 202b using a network 250. In some embodiments, data storage network 200 may be embodied as SAN 108, as discussed in reference to FIG. 1.

Consistent with various embodiments, the host device 232 and the first and second servers 202a, 202b may be computer systems. For example, in some embodiments the host device 232 and the first and second servers 202a, 202b may be storage server computers. The host device 232 includes a processor 236 and a memory 238. The memory 238 may include an operating system 240 and one or more applications 242 configured to utilize (e.g., access) data stored in the first and second storage 220a, 220b. Likewise, the first and second servers 202a, 202b include one or more processors 206a, 206b and one or more memories 208a, 208b, respectively. The memories 208a, 208b of the first and second servers 202a, 202b may include storage managers 210a, 210b and caches 212a, 212b.

The first and second servers 202a, 202b and the host device 232 may be configured to communicate with each other through an internal or external network interface 204a, 204b, and 234. The network interfaces 204a, 204b, and 234 may be, e.g., modems or network interface cards. For example, the network interfaces 204a, 204b, and 234 may enable the host device 232 and the first and second servers 202a, 202b to connect to the network 250 and communicate with each other.

The first storage 220a and second storage 220b illustrate data storage nodes in the data storage network 200. In some embodiments, the first storage 220a and/or second storage 220b are the same as, or similar to, the storage 110. In some embodiments, the first storage 220a includes a first set of (i.e., one or more) volumes 222a where data is stored and/or retrieved by the host device 232. Similarly, the second storage 220b includes a second set of volumes 222b. The volumes 222a, 222b may include a Logical Unit Number (LUN), Logical Subsystem (LSS), or any other grouping of tracks, where a track may be a block, track, or any other data unit. The data in second storage 220b (e.g., the second set of volumes 222b) may be a copy of the same data stored in the first storage 220a (e.g., a copy of the first set of volumes 222a). The host device 232 may access first and second volumes 222a, 222b in the first storage 220a and the second storage 220b, respectively, over the network 250.

The host device 232 may direct Input/Output (I/O) requests to the first server 202a, which may function as a primary server, to access tracks stored in the first storage 220a. The second server 202b may function as a secondary, or backup, server in the event that the data could not be accessed via the first server 202a. In the event that the host device 232 (or the first server 202a) detects that the first set of volumes 222a are unavailable or untrustworthy, a copy of the requested data (e.g., the data that was being read or written to) may be retrieved from corresponding tracks or volumes in the second set of volumes 222b. The corresponding tracks may then be written over the data tracks in the first set of volumes 222a.

The first and second servers 202a, 202b and/or the host device 232 may be equipped with a display or monitor. Additionally, the first and second servers 202a, 202b and/or the host device 232 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.).

The first and second servers 202a, 202b and the host device 232 may be distant from each other and communicate over a network 250. In some embodiments, the host device 232 may be a central hub from which first and second servers 202a, 202b can establish a communication connection, such as in a client-server networking model. Alternatively, the host device 202b and first and second servers 202a, 202b may be configured in any other suitable networking relationship (e.g., in a peer-to-peer configuration or using any other network topology).

In some embodiments, the network 250 can be implemented using any number of any suitable communications media. For example, the network 250 may be a wide area network (WAN), a local area network (LAN), a SAN, an internet, or an intranet. In certain embodiments, the first and second servers 202a, 202b and the host device 232 may be local to each other, and communicate via any appropriate local communication medium. For example, the first and second servers 202a, 202b and the host device 232 may communicate using a SAN, one or more hardwire connections, a switch such as a fibre channel switch or FICON director, a wireless link or router, or an intranet. In some embodiments, the first and second servers 202a, 202b and the host device 232 may be communicatively coupled using a combination of one or more networks and/or one or more local connections. For example, the first server 202a may be hardwired to the host device 232 (e.g., connected with a fibre channel cable) while the second server 202b may communicate with the host device using the network 250 (e.g., over the Internet).

In some embodiments, the network 250 may be a telecommunication network. The telecommunication network may include one or more cellular communication towers, which may be a fixed-location transceiver that wirelessly communicates directly with a mobile communication terminal (e.g., first and second servers 202a, 202b). Furthermore, the network may include one or more wireless communication links between the first and second servers 202a, 202b and the host device 232. The wireless communications links may include, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), or any other wireless communication technology or standard to establish a wireless communications link.

In some embodiments, the network 250 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 250.

The first and second servers 202a, 202b may include a storage manager 210a, 210b. Storage managers 210a, 210b may be modules (e.g., program instructions, hardware) in the data storage network 200 configured to store and retrieve data. The storage managers 210a, 210b may include a storage controller. In some embodiments, the first storage manager 210a includes a set of instructions to process an I/O request (e.g., a read, delete, insert, update, and/or write of data) received by the host device 232 onto the first storage 220a. The storage managers 210a, 210b can also include a set of instructions to simultaneously maintain a copy of the first storage 220a on the second storage 220b.

In one illustrative example embodiment, the storage manager(s) 210a, 210b can monitor the first storage 220a for errors that can indicate a pinned data set on the primary storage. For example, the storage manager(s) 210a, 210b can identify (e.g., detect) a unit error during a consistency check or data scrubbing operation of the first storage 220a or of one or more volumes in the first set of volumes 222a and generate a storage-health message. As another example, the storage manager(s) 210a, 210b may identify an error as part of a failed I/O request (e.g., a failed write or read request), may determine that there is pinned data on the first storage 220a, and may generate a unit check.

In some embodiments, in response to identifying the pinned data set on the first storage 220a, the storage manager(s) 210a, 210b (and/or host device 232) can determine which track(s) (and/or volume(s) 222a) in the first storage 220a are pinned. The storage manager(s) 210a, 210b can then identify corresponding tracks in the second storage 220b. The corresponding tracks are tracks that include a synchronous copy of the data found in the pinned tracks. The storage manager(s) 210a, 210b may then copy the corresponding tracks from the second storage 220b and write them over the pinned tracks in the first storage 220a. Various methods for writing corresponding tracks over pinned tracks are discussed in more detail with respect to FIGS. 3-6.

The first and second storages 220a, 220b may comprise different types or classes of storage devices. For example, the first and second storages 220a, 220b may include magnetic hard disk drives, solid state storage devices (SSDs), Electrically Erasable Programmable Read-Only Memory (EEPROM), flash memory, flash disk, Random-Access Memory (RAM), storage-class memory (SCM), Phase Change Memory (PCM), Resistive Random-Access Memory (RRAM), optical disk, tape, etc. Further, the first and second storages 220a, 220b may be configured as an array of devices, such as a Just a Bunch of Disks (JBOD), Direct Access Storage Device (DASD), or Redundant Array of Independent Disks (RAID) array.

It is noted that FIG. 2 is intended to depict the representative major components of an exemplary computing environment 200. In some embodiments, however, individual components may have greater or lesser complexity than as represented in FIG. 2, components other than or in addition to those shown in FIG. 2 may be present, and the number, type, and configuration of such components may vary. Likewise, one or more components shown within the computing environment 200 may not be present, and the arrangement of components may vary.

For example, while FIG. 2 illustrates a computing environment 200 with a single host device 232 and two servers 202a, 202b, suitable computing environments for implementing embodiments of this disclosure may include any number of servers and host devices. The various models, modules, systems, and components illustrated in FIG. 2 may exist, if at all, across a plurality of host devices and servers.

For example, in some embodiments, the storage managers 210a, 210b may not be a part of the first and second servers 202a, 202b, or only one of the first and second servers 202a, 202b may include a storage manager. In some embodiments, the storage manager may be a standalone device distinct from the first and second servers. In these embodiments, the storage manager may be communicatively coupled with any of the first and second servers 202a, 202b and/or the first and second storages 220a, 220b (e.g., over the network 250). As another example, some embodiments may include two (or more) host devices. Each host device may be connected to two (or more) servers. Likewise, the first and second servers 202a, 202b may be connected to, and store data for, two or more host devices.

Figure 3:
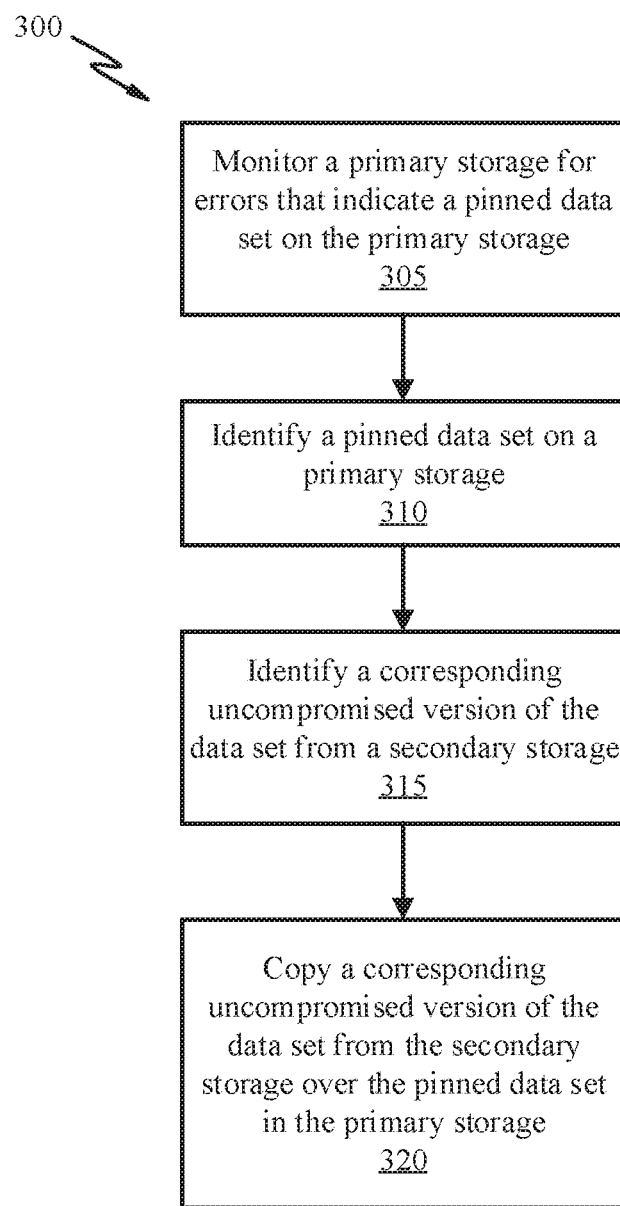
FIG. 3 illustrates a flow diagram of an example method for managing data in a storage network, in accordance with embodiments of the present disclosure.

Referring now to FIG. 3, illustrated is an example process 300 for correcting pinned data, according to embodiments. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process.

The process 300 begins by monitoring a primary storage for errors that indicate a pinned data set on the primary storage. This is illustrated at step 305. In some embodiments, a data volume is monitored by a storage manager, as discussed in relation to FIG. 2, in order to discover and identify pinned data. In some embodiments, the error can be detected that indicates pinned data following a consistency check or disk scrubbing. In some embodiments, the storage controller (e.g., storage controller 1216) issues the command to execute the set of instructions to perform step 305.

For example, the process 300 can include program instructions to flag a data set (e.g., one or more track(s)) as "pinned data" upon the receipt of an error that indicates pinned data. In some embodiments, the error may be a unit check error. The unit check error may include sense data that contains information used to identify pinned data. In some embodiments, the sense data can be, for example, 32 bytes in size, although any size of sense data otherwise consistent with this disclosure is contemplated.

In some embodiments, a unit check error does not include sense data. In some embodiments, the sense data is invalid or erroneous. In other embodiments, the process 300 can include instructions to flag a data set as pinned data upon generating a storage health event that indicates pinned data. In other embodiments, the process 300 can include a set of instructions to flag a data set as pinned for any other hardware or software error. For example, hardware and/or software errors can include, or be associated with, hardware failures, unit check errors, read/write errors, system bus errors, memory errors, machine check errors, etc.

The process continues by identifying a pinned data set on a primary storage. This is shown at step 310. In some embodiments, the identifying is done by the storage manager. For example, storage 110, first storage 220a, and second storage 220b (of FIGS. 1 and 2), are examples of data volumes that can have errors identified therein or other identifying factors that could indicate the presence of pinned data. In some embodiments, the storage controller (e.g., storage controller 1216) issues the command to execute the set of instructions to perform step 310.

The following is an example embodiment of steps 305 and 310. Part of an error recovery procedure (ERP) is to examine a failed channel program. From information provided in the I/O completion for the unit check, the ERP can determine ending channel command words (CCW) and the track which a channel program was attempting to access when a unit check occurred. By monitoring and examining errors on the storage medium, pinned data can be identified as shown in steps 305 and 310. In the ERP, the pinned data is read from the track on the secondary storage and then written to the corresponding track on the primary storage. By writing over the pinned data on the primary storage, the error is cleared. Once the recovery is complete, the original I/O is retried or rescheduled. When writing to the primary storage, two recovery processes may try to recover the same track at the same time and create a situation where one routine writes over data that has already been recovered by the other recovery process and subsequently updated. This can be resolved by using token transfer or prefix bit protocols, described further below.

Following a pinned data set being identified, the process identifies a corresponding unpinned version of the data set from a secondary storage. This is illustrated at step 315. As explained above, a primary storage is a storage medium that provides data to a server following an I/O request. A synchronous pair system can have two separate storage systems. This gives a level of redundancy that provides a geographical advantage. Identical copies of data can exist between this synchronous pair to the other side of the city or to a nearby city. In some embodiments, the storage controller (e.g., storage controller 1216) issues the command to execute the set of instructions to perform step 315.

Storage nodes may utilize a token in order to identify this unique instance of pinned data being detected. When the pinned data is detected on a unit check, an ERP can be scheduled. The storage system (e.g., via a storage manager 210a, 210b of FIG. 2) can return a unique token with the sense data or via a new command issued by the ERP that indicates this error. In the case that the pinned data is detected via a storage health event, the token can be returned as part of a read subsystem data command.

As used herein, a "token" may be an identification symbol that uniquely identifies the instance of pinned data detected. The token may contain a timestamp, a serial number for the storage system, an LS S number, unit address and set of tracks associated by the pinned data, such that two tokens representing two different instances of pinned data detection would not have the same value. The token would be invalidated upon the track being overwritten and "fixed." Thus, if two or more recovery process were to detect the same error at the same time, the first to correct the problem would be able to overwrite the track since the token passed on the write request matches the one provided by the storage system at the time of error. However, the second attempt to fix the record would fail as the token specified on the write would now be viewed as invalid by the storage system. Alternatively, a subsequent error may have been detected and the storage system has the new token, and the write would fail because the token specified on the write is not equal to the current token as viewed by the storage system.

In other words, the error that the recovery process is attempting to recover has already been recovered, and a subsequent pinned data has occurred. A token may include various fields such as metadata, the description for the data track (e.g., a point-in-time copy of data), and a unique identifier. The token is used by the recovery process to ensure that two different recovery processes aren't recovering the same track at the same time. The token provides a unique identifier when the error is detected associated with the write so that the tokens must be the same before the track is updated.

The token needs to be unique to cover the scope of the error and time (e.g., or instance) of the failure. When the write is issued, the write can contain the token. The storage system can verify that the identifier provided with the token in the write matches the token it has for this error and only make the change if the tokens match. The storage system would ensure this write is done atomically by locking the track and comparing the tokens. In one embodiment, if the tokens are the same, then the process includes a set of instructions that updates the track. In another embodiment, if the tokens are not the same, the track is not updated and instead the original I/O request is rescheduled. Following a successful write, and assuming that no subsequent error has been detected, the pinned data error on the data track is removed.

In some embodiments, another solution includes a process that can correct pinned data by providing a bit in the prefix of the I/O request. For example, in some embodiments, the prefix bit can identify that the write is intended to repair a data sequence or data track that includes data with an error. When the storage system verifies that the prefix bit included in write channel command is specified, the storage system can verify whether or not the data is still pinned. If the data is still pinned, the storage system can then overlay the data track with the track copies from the secondary storage. If the data is not pinned, then another error recovery procedure process has already "fixed" the pinned data problem, and the storage controller should not overlay the track.

Following the identification of the corresponding uncompromised version of the data set from the secondary storage, the process reads the data per step 320. At this step, the process copies a corresponding uncompromised version of the data set from the secondary storage over the pinned data set in the primary storage. In some embodiments, this can include reading the uncompromised version and writing the uncompromised version over the pinned data. In some embodiments, copying can also be done by synchronous mirroring data between the two storage systems.

In some embodiments, the copy process step 320 can be performed by one or more sub-processes. In some embodiments, the storage manager may first delete the pinned data set from the first storage 220a. Following the deletion of the pinned data set, the corresponding uncompromised version of the data set is received from the second storage 220b and that data set is saved (e.g., by the storage manager) to the first storage 220a. This sub-process would effectively replace the pinned data with "unpinned" data. In another embodiment, the corresponding uncompromised version of the data set is retrieved from the second storage 220b and directly written over the top of the pinned data set on the first storage 220a. In other embodiments, the pinned data set is replaced with an unpinned version of the same data set by any other process. In some embodiments, a processor is configured to issue the command to execute the set of instructions to perform step 320. In some embodiments, the storage controller (e.g., storage controller 1216) issues the command to execute the set of instructions to perform step 320.

Following the identification of a corresponding uncompromised version of the data set from a secondary storage, the sub-process can include a set of instructions for overlaying the pinned data with an uncompromised copy of the corresponding data.

Figure 4:
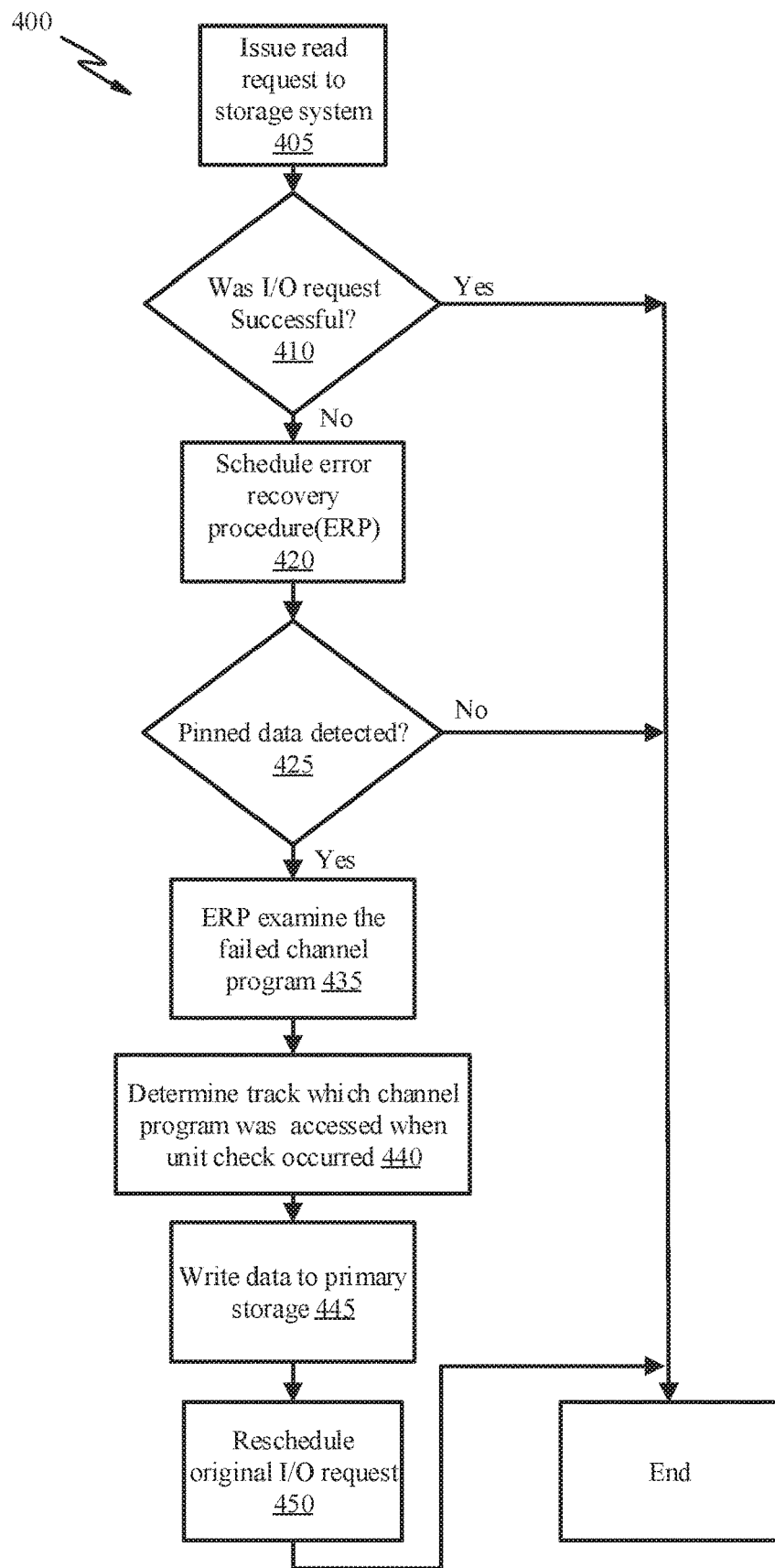
FIG. 4 illustrates a flow diagram of an example method for repairing a storage system in response to a failed read request, in accordance with embodiments of the present disclosure.

Referring now to FIG. 4, illustrated is an example process 400 of repairing a storage system in response to a failed read request, according to some embodiments. One or more operations of the process 400 may be performed by an I/O supervisor component of an operating system (e.g., operating system 240 in FIG. 2), by a storage controller (e.g., storage controller 1216 in FIG. 12), and/or by a processor. In some embodiments, the process 400 begins by issuing a read request. This is illustrated at step 405. In some embodiments, step 405 includes any issued I/O request. In some embodiments, step 405 includes a copy request. In some embodiments, a storage controller (e.g., storage controller 1216) issues the command to execute the set of instructions to perform step 405. The process 400 is a computer-implemented process.

In some embodiments, the process continues by determining if the I/O request is successful. This is shown at step 410. In some embodiments, the process can determine if the I/O request is successful by scanning for a failed I/O request and/or unit check. When the I/O request is successful, the process can terminate. In some embodiments, the process can determine that an I/O request was unsuccessful when a unit check error is returned. In some embodiments, the process can determine that an I/O request is unsuccessful when an error is detected following the read request. In some embodiments step 405 includes a write request. If the I/O request is successful then the I/O request can be processed/handled and the process 400 can end. In some embodiments, the I/O request is determined to be successful when no error is detected following the completion of the I/O request. In some embodiments, the storage controller (e.g., storage controller 1216) issues the command to execute the set of instructions to perform step 410.

If the request I/O request is not successful, then the process can schedule an error recovery procedure (ERP). This is illustrated at step 420. In some embodiments, the parameters of the error recovery procedure can be determined by sense data included with the error resulting from the failed I/O request. In some embodiments, the storage controller (e.g., storage controller 1216) issues the command to execute the set of instructions to perform step 420.

Following the return of the unit check, it is determined if the sense data indicates that the track being read includes pinned data. This is illustrated at step 425. In some embodiments, step 425 can be part of step 310. If the unit check indicates that data track does not include pinned data, the process 400 ends. In some embodiments, the error state regarding the tracks of data that are in question can be determined by a unique token.

In some embodiments, the unique token can be associated with the sense data returned with the unit check. In some embodiments, the unique token can be extracted from the sense data. In some embodiments, the unique token can be obtained by a new command. In some embodiments, the sense data can be used to determine if pinned data is detected, as described further above. In some embodiments, the storage controller (e.g., storage controller 1216) issues the command to execute the set of instructions to perform step 425.

In some embodiments, the processor can determine the possible presence of pinned data when a failed channel program, or a channel program check is returned. In some embodiments, the error recovery procedure can examine the failed channel program. This is illustrated at step 435. The failed channel program can include a channel program check. In some embodiments, the failed I/O request can be due to a logical error, such as: no record found, extent error, channel program check error, or command reject. In some embodiments, the storage controller (e.g., storage controller 1216) issues the command to execute the set of instructions to perform step 435.

Following the examination of the failed channel program, the process continues by determining the track(s) which the channel program was attempting to access when the unit check occurred to determine which tracks have pinned data. This is illustrated at step 440. From the information provided in the sense data, the error recovery procedure determines the ending CCW and the track(s) which the channel program was attempting to access when the unit check occurred. In some embodiments, one or more data tracks are identified by using the unique token. In some embodiments, the storage controller (e.g., storage controller 1216) issues the command to execute the set of instructions to execute step 440.

Following the determination of the track(s) which the channel program was attempting to access when the unit check occurred, the error recovery procedure can write the data from one or more data track(s) on the secondary storage over corresponding data track(s) on the primary storage. This is illustrated at step 445. In some embodiments, the CCW writing the track would specify a prefix bit, identifying this write as an attempt to fix a pinned data error in order to prevent multiple overlays of data and prevent data loss. In some embodiments, the data track to be copied over can be tied to a unique token so that only the data track that corresponds to that token can be copied over the pinned data track. In some embodiments, the storage controller (e.g., storage controller 1216) issues the command to execute the set of instructions to perform step 445.

After the data is copied over, the original I/O request can be rescheduled. This is illustrated at step 450. Following the rescheduling of the original I/O request, the process can end. In some embodiments, following the rescheduling of the original I/O request, the process can loop back to step 410 and determine if I/O request was successful. In some embodiments, process 300 can include process 400. In some embodiments, the processor 236 issues the command to execute the set of instructions to perform step 450. In some embodiments, the storage controller (e.g., storage controller 1216) issues the command to execute the set of instructions to perform step 450.

Figure 5:
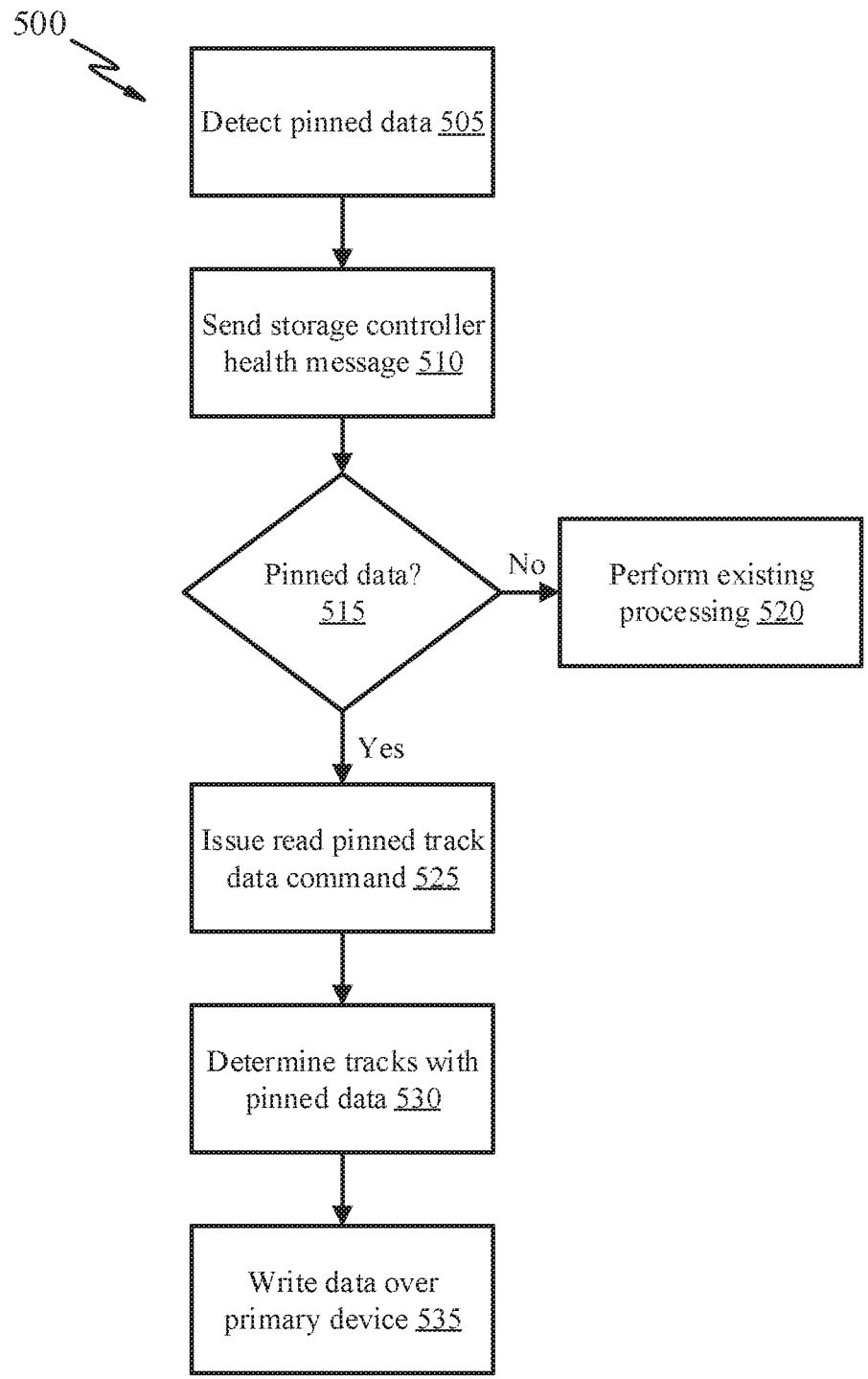
FIG. 5 illustrates a flow diagram of an example method for repairing a storage system with pinned data detected, in accordance with embodiments of the present disclosure.

Referring now to FIG. 5, illustrated is an example process 500 for repairing a data storage device with pinned data, according to embodiments. The process 500 begins by detecting an error that indicates pinned data. In some embodiments, the error can be detected following a consistency check or disk scrubbing. Errors that indicate pinned data are discussed in more detail above. This is illustrated at step 505. In some embodiments step 505 is similar to step 425 and/or step 310. In some embodiments, the storage system (e.g., storage system 200) issues the command to execute the set of instructions to perform step 505.

Following the detection of pinned data, the storage system sends a heath message to the I/O supervisor component of the operating system (240). This is illustrated at step 510. In some embodiments, the storage system (e.g., storage system 200) issues the command to execute the set of instructions to perform step 510.

The process continues in IOS by determining if a storage health message indicates pinned data. This is shown at step 515. In some embodiments, step 515 is the same as step 425 and/or step 310. A storage health message can include the detection of a unit check error. In some embodiments, the storage system (e.g., storage system 200) issues the command to execute the set of instructions to perform step 515.

When the storage health message does not detect pinned data, the existing process is allowed to continue. This is illustrated at step 520. For example, the existing process can be an I/O request, etc. In some embodiments, the storage system (e.g., storage system 200) issues the command to execute the set of instructions to perform step 520.

When the storage message is determined to indicate pinned data, the process continues by issuing a "read subsystem data"/"pinned track data" command. This is illustrated at step 525. In some embodiments, the "pinned track data" command is issued in the place of the "read subsystem data" command. The pinned track data command returns information on which tracks are pinned. Detection of pinned data is discussed further in the process 300 discussion. In some embodiments, the storage system (e.g., storage system 200) issues the command to execute the set of instructions to perform step 525.

The process continues by determining one or more data tracks with pinned data. This is illustrated at step 530. At this step, the process determines which tracks indicate pinned data by using information in the "pinned track data" response. In some embodiments, the pinned track data response returns data identifying the pinned data track. In some embodiments, the "pinned track data" command includes information to extract the unique token that identifies the pinned data track. The unique token is discussed further above. In some embodiments, the storage system (e.g., first storage 220a and second storage 220b) issues the command to execute the set of instructions to perform step 530.

The process continues by writing data from one or more data track(s) on the secondary storage over the corresponding data track(s) on the primary storage. This is illustrated at step 535. In some embodiments, step 535 is the same as step 445 and/or step 320. In some embodiments, the storage system (e.g., storage system 200) issues the command to execute the set of instructions to perform step 535. In some embodiments, one or more data tracks to be written over are identified with the unique token. In some embodiments, a prefix bit is used to indicate to the storage system that this I/O request is being issued to repair a pinned data problem. The unique token and the prefix bit are discussed further above. In some embodiments, process 300 can include process 500.

Figure 6:
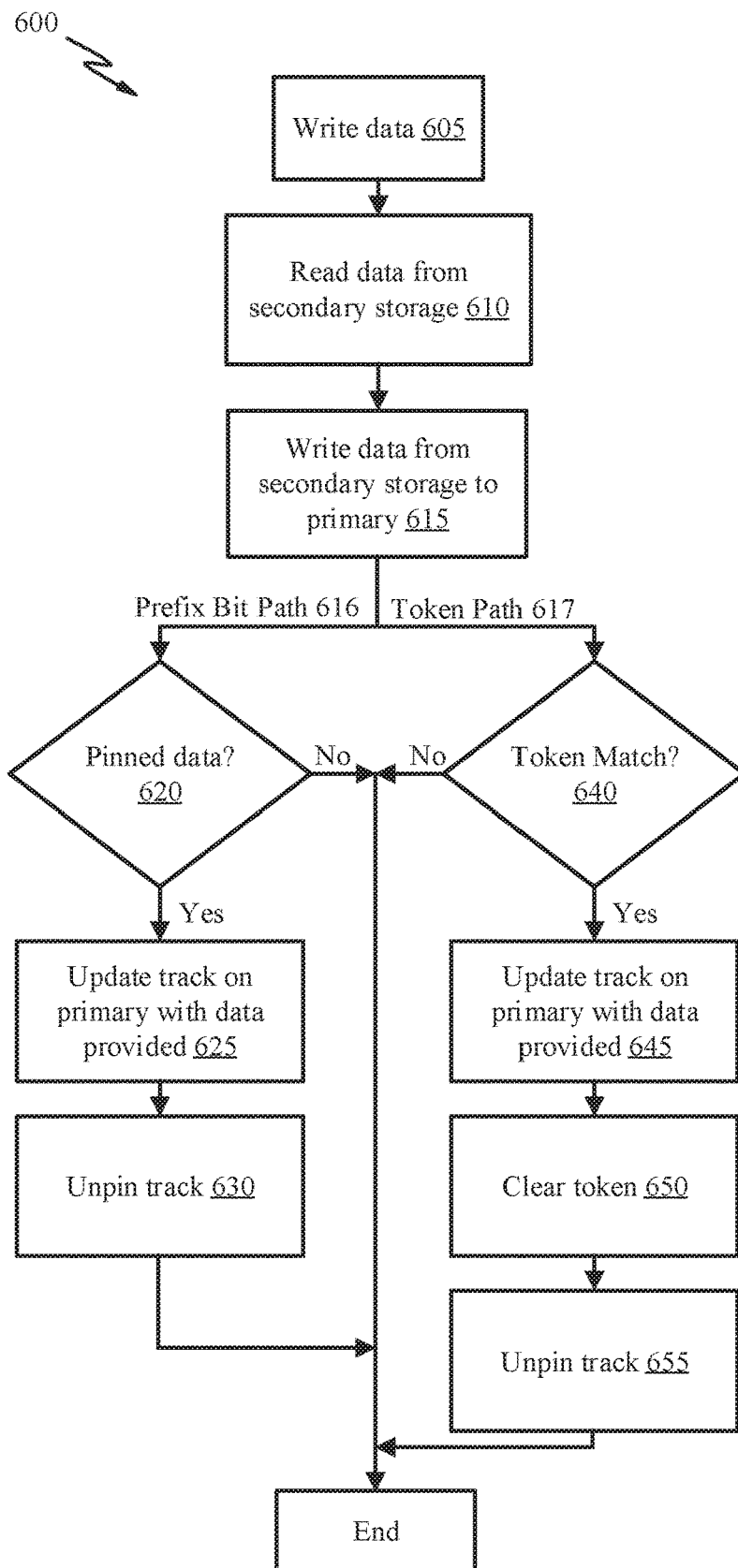
FIG. 6 illustrates a flow diagram of an example method for detecting pinned data following a write data request, in accordance with embodiments of the present disclosure.

Referring now to FIG. 6, shown is an example process 600 for repairing a storage system using a synchronous copy of the storage system. For example, the storage servers 202a and 202b can maintain a synchronous relationship between the first storage 220a and the second storage 220b. The process begins by executing a set of instructions that result in reading data from a first storage 220a. This is illustrated at step 605. Following the read command, in some embodiments, a unique token, storage controller health message, or unit check error will be returned by the storage controller. In some embodiments, data in the error that is returned can be used to determine that pinned data is present on the primary storage. In some embodiments, the I/O Supervisor Component of the operating system 240 (IOS) issues the command to execute the set of instructions to perform step 605.

Following the determination that pinned data is present on the primary storage, the process can execute a set of instructions to read the corresponding data track of the pinned data track on the first storage 220a, from the second storage 220b. This is shown at step 610. In some embodiments, the IOS issues the command to execute the set of instructions to perform step 610.

The process continues by writing data tracks from the second storage 220b over the corresponding data tracks on the first storage 220a. This is illustrated at step 615. In some embodiments, step 615 is the same as steps 535, 445, and/or 320. At this step, the process may continue in one of two ways to identify the data track, depending on the configuration of the system. In some embodiments, the IOS issues the command to execute the set of instructions to perform step 615. If the system is configured to implement the prefix bit solution path 616, the process writes the data track with a prefix bit. If the system is configured to implement the token solution path 617, the process writes the data track with a unique token.

In some embodiments, where the prefix bit path 616 is performed, the process continues by the storage controller determining if data being written is currently "pinned." This is illustrated at step 620. In some embodiments, step 620 is the same as step 515, 425, and/or 310. If it is determined that the data being written is not pinned data, then the problem has already been fixed by another process and the process 600 ends. In some embodiments, the write request is failed if it is determined that the problem has already been fixed by another process.

When it is determined that the data being written is pinned data, the process continues by updating the track on the first storage 220a with the data provided on the write command. This is illustrated at step 625. In some embodiments, the storage controller (e.g., storage controller 1216) or IOS issues the command to execute the set of instructions to perform step 625.

Following the completion of the write command, the process continues by executing a set of instructions to unpin the data track on the first storage 220a. This is illustrated at step 630. In some embodiments, following the unpinning of the data track the process can end. In some embodiments, following the unpinning of the data track, the process can loop back to step 605. In some embodiments, the storage controller (e.g., storage controller 1216) issues the command to execute the set of instructions to perform step 630.

In embodiments where the token path 617 is performed, the process continues by comparing the token specified in the write command to the current token that the controller has for the error to determine if the tokens match. This is shown at step 640. If the tokens do not match, then this would indicate that the problem has already been fixed and the process can end. In some embodiments, the write request is failed if it is determined that the problem has already been fixed by another process. In some embodiments, the storage controller (e.g., storage controller 1216) issues the command to execute the set of instructions to perform step 640.

If the tokens do match, then the process 600 continues by updating the track on the first storage 220a with the data provided on the write command. This is shown at step 645. Following the completion of the write command the process continues by clearing the token on the pinned data track. This is shown at step 650. In some embodiments, the storage controller (e.g., storage controller 1216) issues the command to execute the set of instructions to perform step 650.

Following the clearing of the token, the track is unpinned. This is shown at step 655. In some embodiments, following the completion of unpinning of the track, the process can end. In some embodiments, following the completion of unpinning of the track, the process can loop back to step 605. In some embodiments, process 300 can include process 600. In some embodiments, the storage controller (e.g., storage controller 1216) issues the command to execute the set of instructions to perform step 655.

Figure 7:
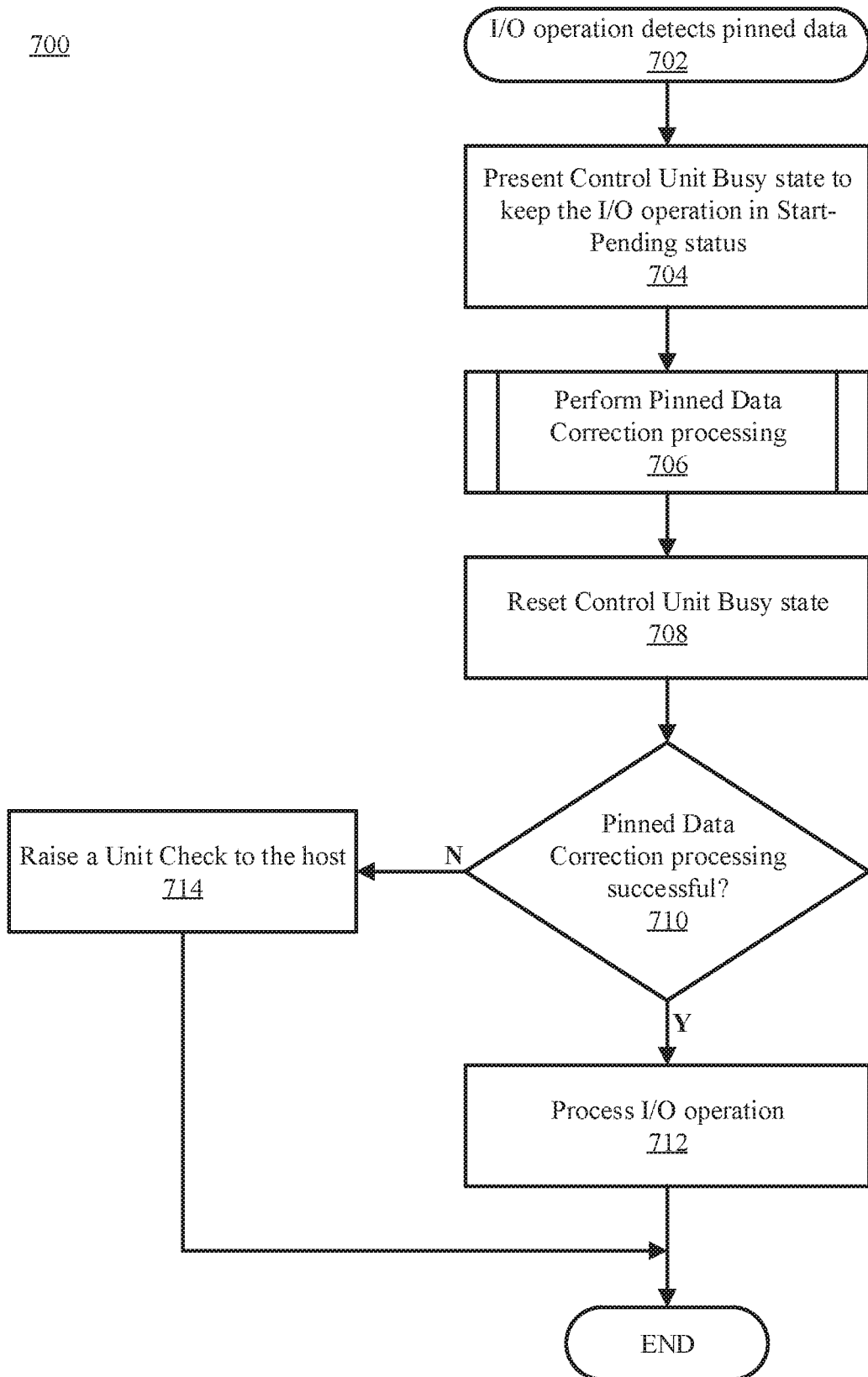
FIG. 7 illustrates a flow diagram of an example method for repairing a storage system with pinned data using a storage controller, in accordance with embodiments of the present disclosure.

Referring now to FIG. 7, shown is a flow diagram of an example method 700 for repairing a storage system with pinned data using a storage controller, in accordance with embodiments of the present disclosure. The method 700 may be performed by a storage controller. The method 700 may begin at operation 702, where the storage controller executing an I/O operation detects pinned data.

After detecting the pinned data at operation 702, the storage controller raises a Control Unit Busy state at operation 704. The Control Unit Busy state may block execution of the I/O operation while the data recovery is attempted. Additionally, the Control Unity Busy state may cause the host application I/O to receive Start Pending conditions, preventing the host application I/O from being started, and preventing potential interference from other I/O operations during the data recovery process.

After raising the Control Unit Busy state at operation 704, the storage controller performs Pinned Data Correction processing at operation 706 to attempt to clear the pinned data, and resets the Control Unity Busy state at operation 708. The Pinned Data Correction processing is described in more detail in FIG. 9.

After resetting the Control Unit Busy state at operation 708, the storage controller determines whether the Pinned Data Correction processing successfully cleared the pinned data at decision block 710. If the Pinned Data Correction processing was unsuccessful (e.g., the data set is still pinned), the storage controller raises a Unit Check to the host at operation 714, and the method 700 may end. The host may then attempt to clear the pinned data (e.g., as described in FIGS. 3-6), perform a HyperSwap to switch the primary and secondary storage, or otherwise respond to the pinned data. If the Pinned Data Correction processing successfully cleared the pinned data from the primary storage, the storage controller processes the original I/O operation at operation 712, and the method 700 may end.

Figure 8:
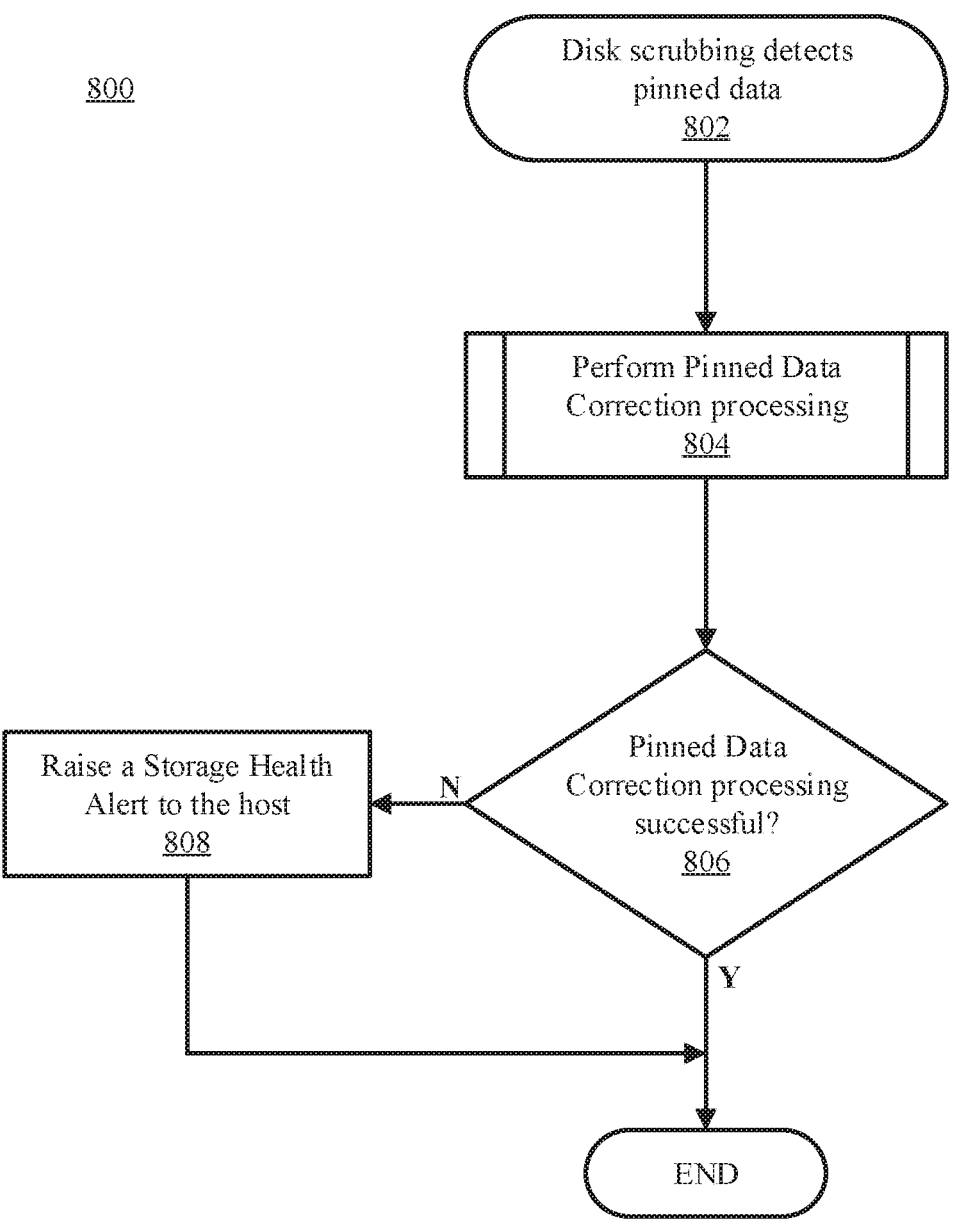
FIG. 8 illustrates a flow diagram of an additional example method for repairing a storage system with pinned data using a storage controller, in accordance with embodiments of the present disclosure.

Referring now to FIG. 8, shown is a flow diagram of an additional example method 800 for repairing a storage system with pinned data using a storage controller, in accordance with embodiments of the present disclosure. The method 800 may be performed by a storage controller. The method 800 may begin at operation 802, where the storage controller detects pinned data during a disk scrubbing operation.

Figure 9:
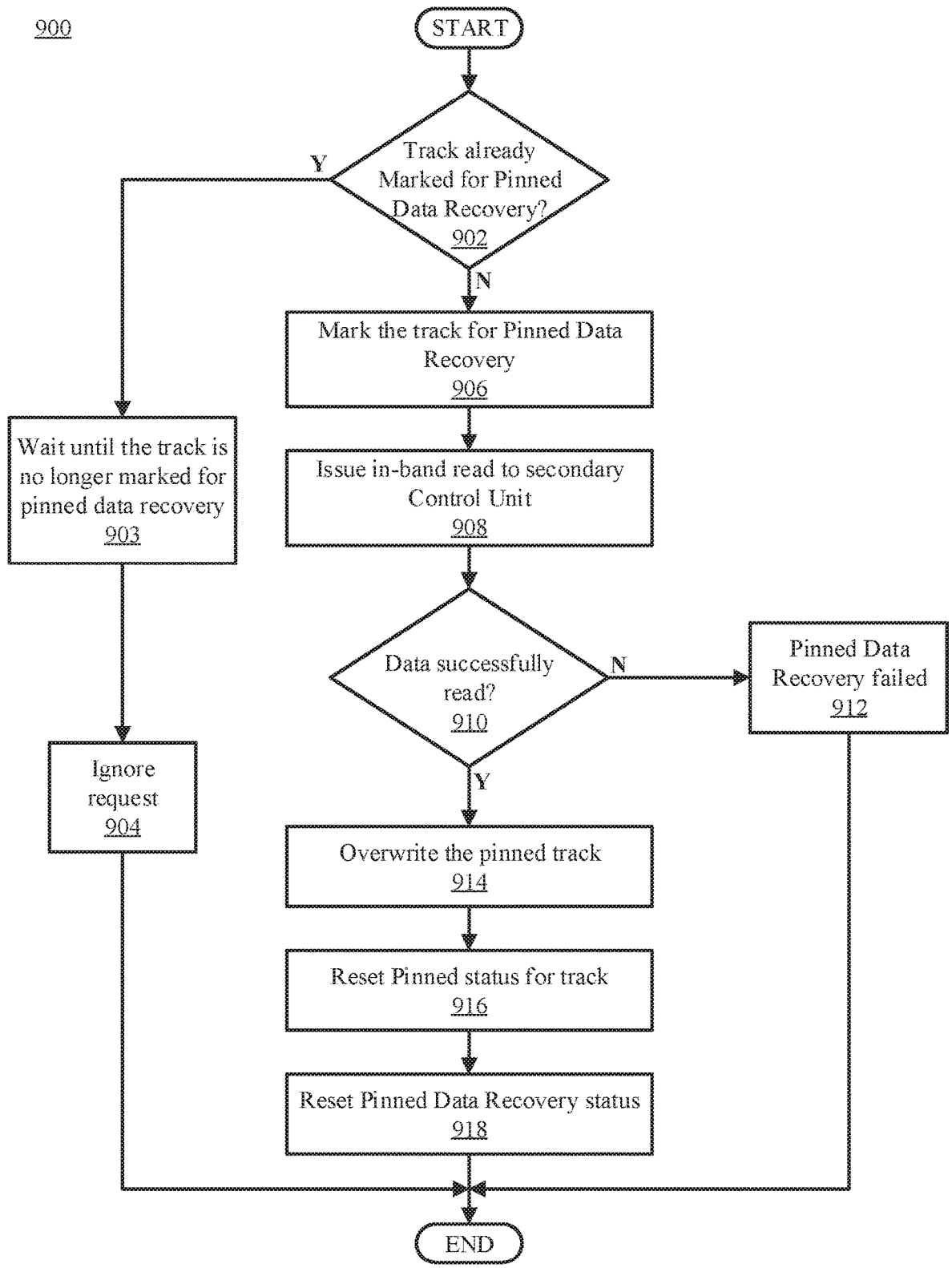
FIG. 9 illustrates a flow diagram of an example pinned data correction process, in accordance with embodiments of the present disclosure.

After detecting the pinned data at operation 802, the storage controller performs Pinned Data Correction processing at operation 804 to attempt to clear the pinned data. The Pinned Data Correction processing is described in more detail in FIG. 9. After performing the Pinned Data Correction processing at operation 804, the storage controller determines whether the Pinned Data Correction processing successfully cleared the pinned data at decision block 806. If the Pinned Data Correction processing was unsuccessful (e.g., the data set is still pinned), the storage controller raises a Storage Health Alert to the host at operation 808, and the method 800 may end. The host may then attempt to clear the pinned data (e.g., as described in FIGS. 3-6), perform a HyperSwap to switch the primary and secondary storage, or otherwise respond to the pinned data. If the Pinned Data Correction processing successfully cleared the pinned data from the primary storage, the method 800 may end Referring now to FIG. 9, shown is a flow diagram of an example pinned data correction process 900, in accordance with embodiments of the present disclosure. The pinned data correction process 900 may be performed by a primary storage controller upon detection of pinned data (e.g., at operation 706 in FIG. 7 or 804 in FIG. 8) in a primary storage. The process 900 may begin at decision block 902, where the primary storage controller determines whether the data set (e.g., a track) with the pinned data is already marked for recovery.

If the primary storage controller determines that the track is already marked for recovery at decision block 902, the primary storage controller waits until the track is no longer marked for pinned data recovery at operation 903, and ignores the Pinned Data Recovery requests at operation 904. This prevents multiple recovery processes for the same track(s) from interfering with each other, and ensures that the Control Unit Busy state is not reset (e.g., as shown in operation 708 of FIG. 7) and the I/O operation processed (as shown in operation 712) prior to the other pinned data recovery process completing. After ignoring the request at operation 904, the process 900 may end. If the primary storage controller determines that the track is not already marked for recovery, the primary storage controller marks the track for Pinned Data Recovery (e.g., by setting a flag) at operation 906. After marking the track at operation 906, the primary storage controller issues an in-band read command(s) to a secondary control unit (e.g., a secondary storage controller) at operation 908.

In some embodiments, the primary storage device may determine whether the track is in Full Duplex mode and that there is not a copy pending prior to sending the in-band command(s) to the secondary storage controller. If the primary storage controller cannot verify that the secondary storage is in Full Duplex mode and that there is not a copy pending, the primary storage controller may terminate the Pinned Data Correction process 900 because the primary storage controller is unable to ensure that the data stored in the secondary storage is an exact copy of the pinned data.

Figure 10:
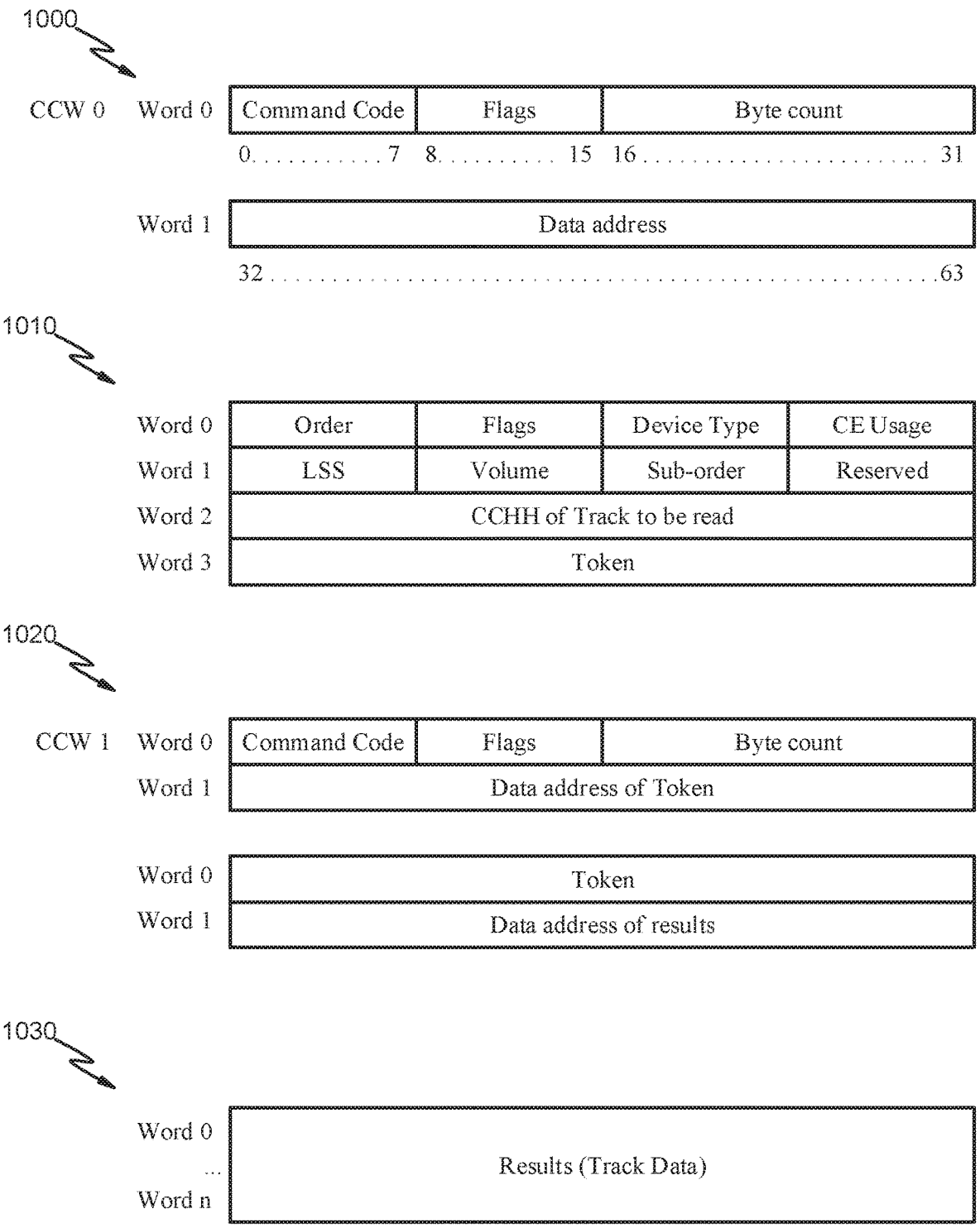
FIG. 10 illustrates example in-band commands between the primary and secondary storage controllers to repair a primary storage system, in accordance with embodiments of the present disclosure.

In some embodiments, the in-band read command(s) may include a pair of commands that transfer contents of the corresponding track on the secondary storage to the primary storage controller so that the pinned data can be overwritten. The first command may instruct the secondary storage controller to prime the data, and the second command may retrieve the data. Example commands and responses are shown in FIG. 10.

For example, the primary storage controller may first issue a Fibre Connection (FICON) Define Subsystem Operation (DSO) write command to the secondary storage controller. This first command may include read track parameters, such as identifiers for the logical subsystem (LSS), the unit address, and the cylinder and head addresses of the pinned track. In response to this first command, the secondary storage controller may read the full contents of the corresponding track(s) (i.e., the track(s) that include a copy of the pinned data set) into a temporary data buffer. The secondary storage controller may also generate a token and return the token to the primary storage controller.

The primary storage controller may then issue a second FICON DSO command to the secondary storage controller. The second command may be a read command, and may include the unique token returned in response to the write command. Upon receiving the second command, the secondary storage controller may return the track data from the temporary from the temporary data buffer, along with a flag indicating that the data is still valid.

While some embodiments use two (or more) commands to retrieve the corresponding data from the secondary storage, other embodiments may use only a single command to retrieve the data.

At decision block 910, the primary storage controller determines whether the data was successfully read from the secondary storage (e.g., that it received valid data). If the primary storage controller did not receive valid data, the primary storage controller declares the Pinned Data Recovery as having failed at operation 912 and process 900 may end. If the data was successfully read from the secondary storage, the primary storage controller overwrites the pinned track(s) at operation 914 using the corresponding data retrieved from the secondary storage. Then, the primary storage controller resets the pinned status for the track(s) (indicating that the track(s) no longer contain pinned data) at operation 916 and resets the pinned data recovery status for the track(s) (indicating that the track(s) are no longer undergoing a recovery process) at operation 918. After clearing the pinned status and pinned data recovery status for the track(s), the process 900 may end.

Referring now to FIG. 10, shown are example in-band commands and responses between the primary and secondary storage controllers used to repair a primary storage system, in accordance with embodiments of the present disclosure. Format 1000 is a general view of a Format-1 Channel Command Word (CCW), which contains the address of the chained DSO command. Command 1010 is a general view of a DSO command used to prepare for the corresponding data track(s) to be read. Command 1010 includes information such as the flags associated with the data track(s) or command, the sub-order code, an identifier for the volume, the cylinder and head addresses (CCHH) of the track(s) to be read), and the token. Command 1010 is sent from the primary storage controller to the secondary storage controller to prime the tracks to the temporary data buffer.

Command 1020 is a general view of an in-band command used to read the track from the temporary data buffer. Command 1020 is sent from the primary storage controller to the secondary storage controller. Results 1030 include the results of the read request (e.g., the corresponding data being read from the secondary storage).

Figure 11:
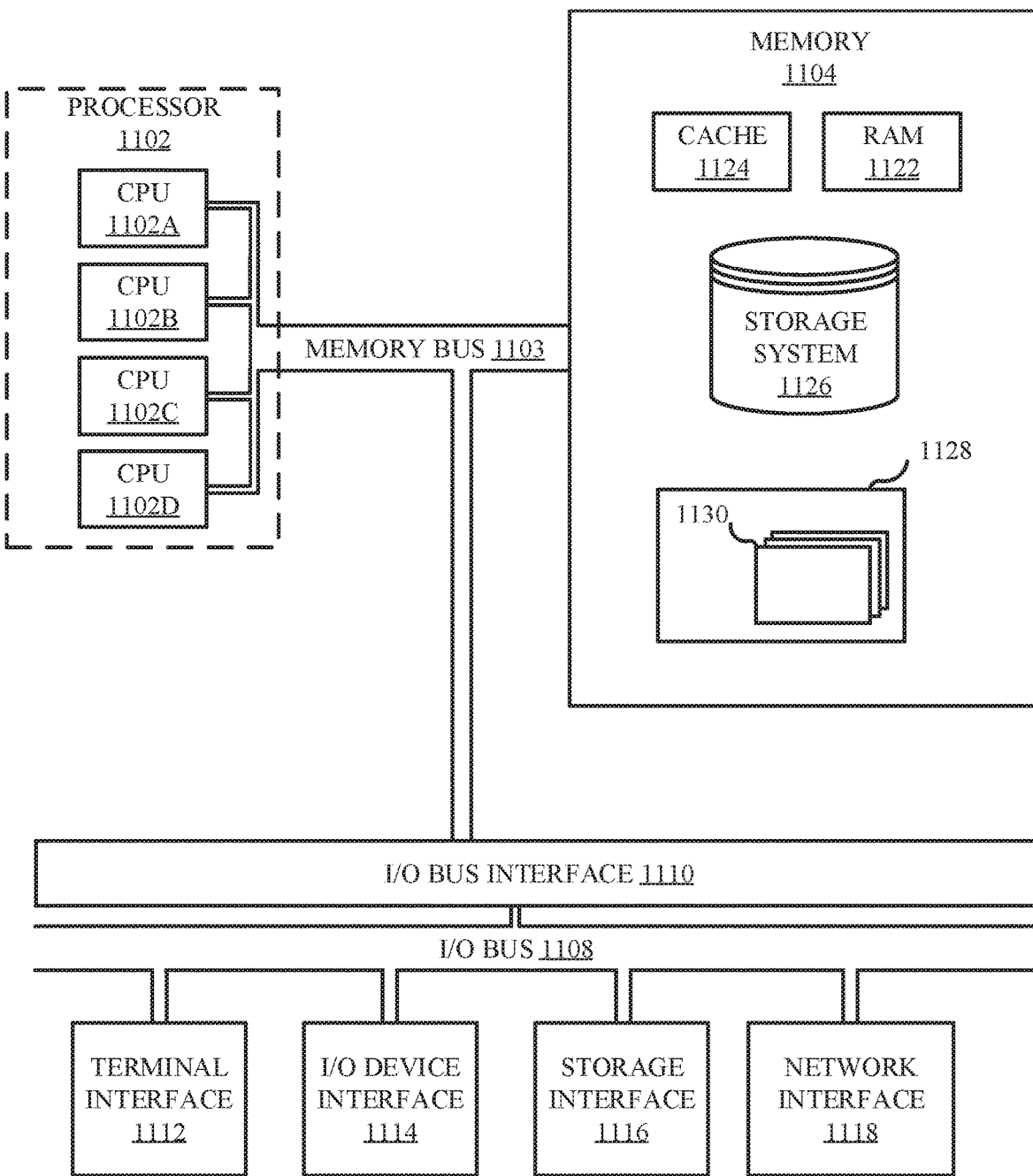
FIG. 11 illustrates a high-level block diagram of an example computer system that may be used in implementing one or more of the methods, tools, and modules, and any related functions, described herein, in accordance with embodiments of the present disclosure.

Referring now to FIG. 11, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 300, 400, 500, and/or 600.)

Figure 12:
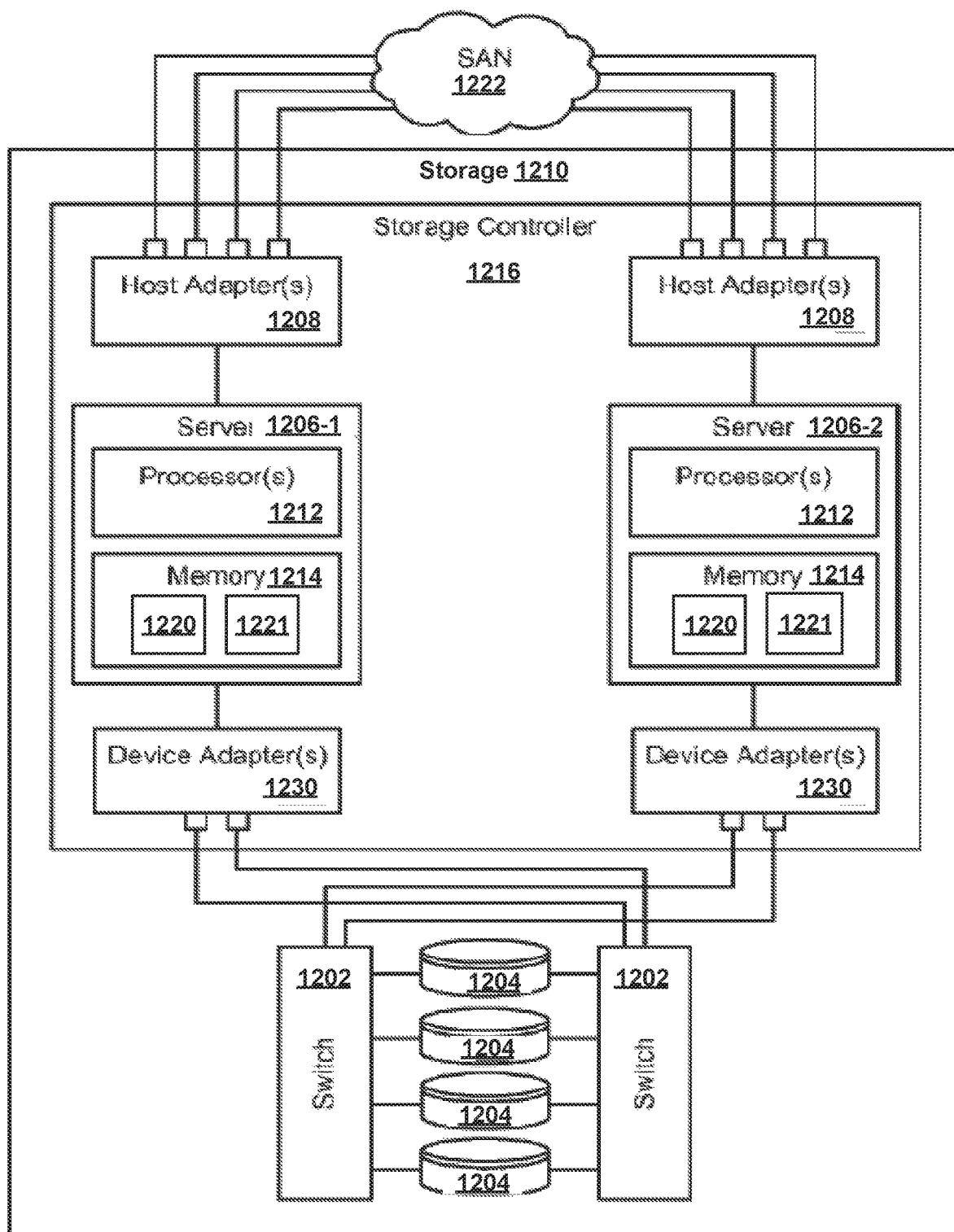
FIG. 12 illustrates an example storage node containing an array of storage volumes, in accordance with embodiments of the present disclosure.

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments. In some embodiments, storage system 1126 includes storage 1210 and storage controller 1216 as well as the components included therein as depicted in FIG. 12 which will be discussed in greater detail below. In some embodiments, the memory can include instructions for executing the processes included herein (e.g., process 300, 400, 500, and/or 600.)

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

As shown in FIG. 12, the storage controller 1216 includes one or more servers 1206 connected to a SAN 1222. The storage controller 1216 may also include host adapters 1208 and device adapters 1230 to connect the storage controller 1216 to host devices and storage devices 1204, respectively. Multiple servers 1206-1, 1206-2, collectively server 1206, may provide redundancy to ensure that data is always available to connected host devices. Thus, when one server 1206-1 fails, the other server 1206-2 may remain functional to ensure that I/O is able to continue between the hosts and the storage devices 1204. This process may be referred to as a "failover."

Particular enterprise storage nodes may have a storage 110 having an architecture similar to storage 1210 illustrated in FIG. 12. Particular enterprise storage nodes may include a high-performance, high-capacity storage controller providing disk storage that is designed to support continuous operations. Particular enterprise storage nodes may use servers 1206-1, 1206-2, which may be integrated with a virtualization engine technology. Nevertheless, management techniques according to the disclosure are not limited to any specific enterprise storage node 1210, but may be implemented in any comparable or analogous storage node 1210 regardless of the manufacturer, product name, or components or component names associated with the storage node 1210. Any storage node 1210 that could benefit from management techniques according to the disclosure is deemed to fall within the scope of the disclosure. Thus, the enterprise storage node shown is presented only by way of example and is not intended to be limiting. For example, storage node 1210 could include data storage device 1204, first storage 220a, second storage 220b, storage system 112, or storage 110, or any combination thereof.

In selected embodiments, each server 1206 includes one or more processors 1212 (e.g., n-way symmetric multiprocessors) and memory 1214. The memory 1214 may include volatile memory 1220 (e.g., RAM) as well as non-volatile memory 1221 (e.g., ROM, EPROM, EEPROM, hard disks, flash memory, etc.). The volatile memory and non-volatile memory may store software modules that run on the processor(s) 1212 and are used to access data in the storage devices 1204. The servers 1206 may host at least one instance of these software modules. These software modules may manage all read and write requests to logical volumes in the storage devices 1204.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
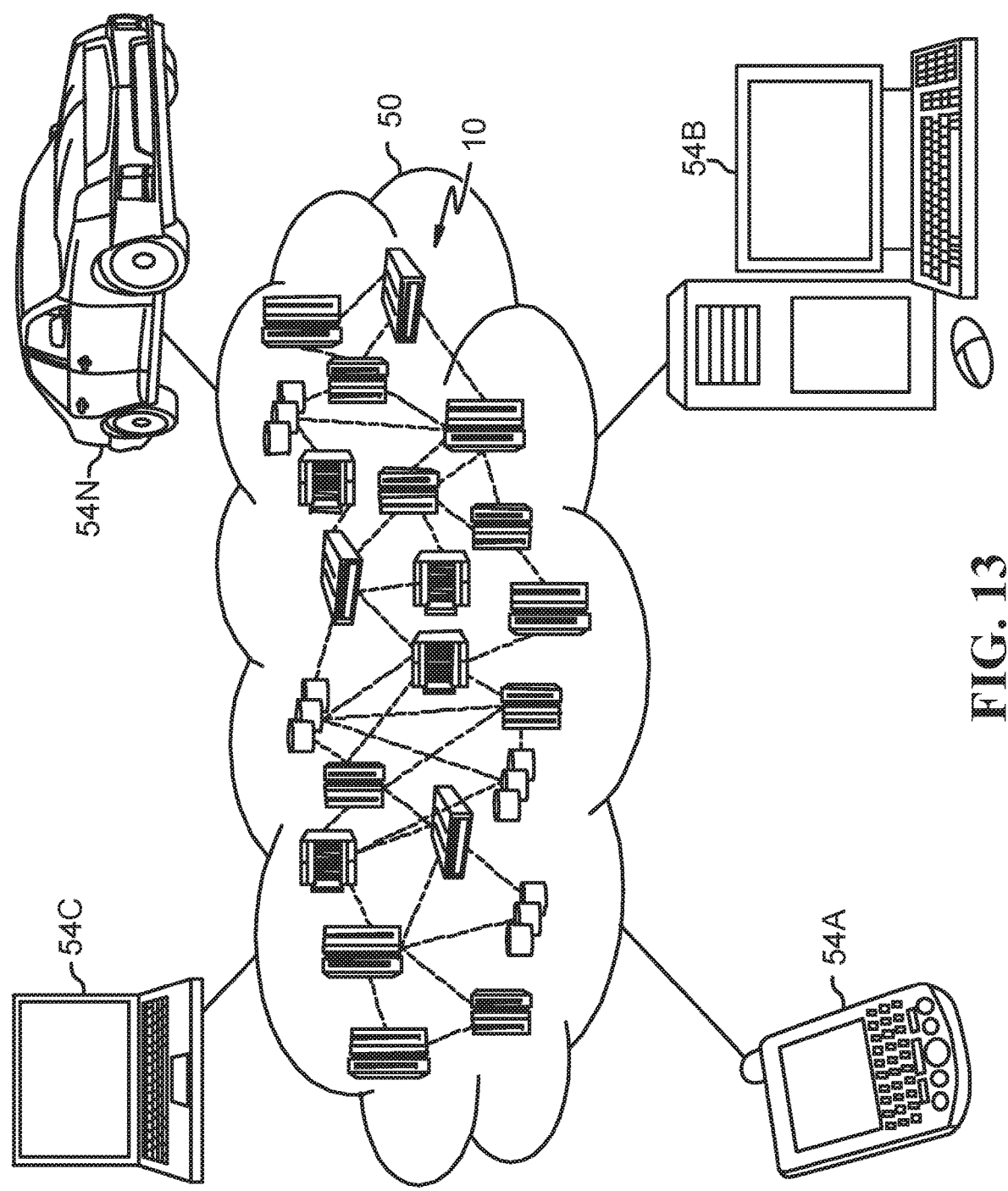
FIG. 13 depicts a cloud computing environment, in accordance with embodiments of the present disclosure.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
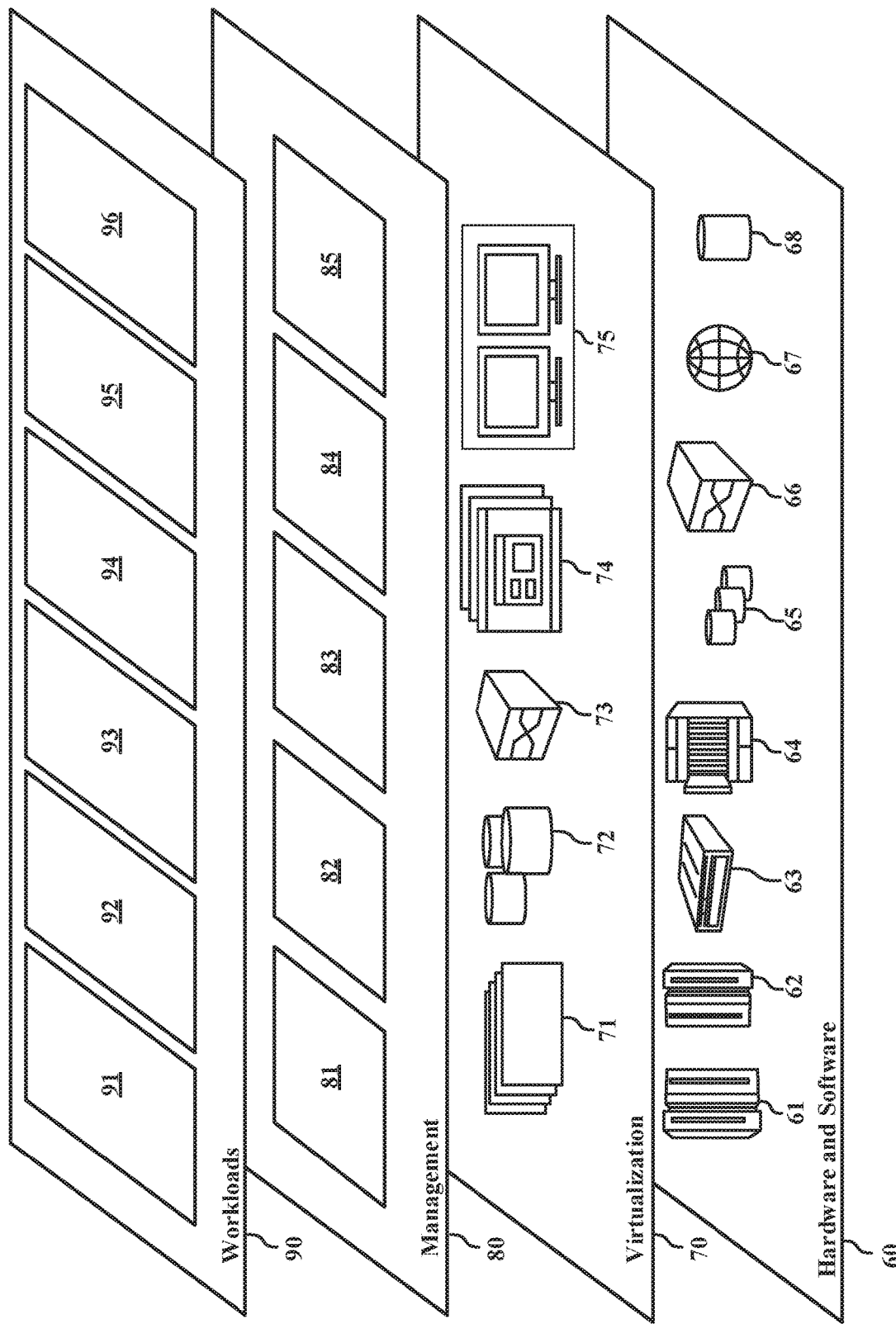
FIG. 14 depicts abstraction model layers, in accordance with embodiments of the present disclosure.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A computer-implemented method for correcting untrusted data and avoiding logical device swapping for at least one logical subsystem of at least one computer system, the method comprising:
    monitoring, by a processor, a primary storage for one or more errors that indicate untrusted data on the primary storage;
    identifying an error that indicates that a data set on the primary storage is an untrusted data set;
    determining, in response to identifying the untrusted data set on the primary storage, that an issued write command token matches an error token identifying the error;
    determining, in response to a prefix bit being set on the write, that the issued write command is intended to correct the error;
    reading, in response to identifying the error indicating the untrusted data set on the primary storage, a corresponding uncompromised version of the data set from a secondary storage; and
    writing the corresponding uncompromised version of the data set from the secondary storage over the untrusted data set on the primary storage.

2. The method of claim 1, wherein identifying the error that indicates that the data set on the primary storage is the untrusted data set includes:
    performing a consistency check operation on the primary storage; and
    determining, in response to performing the consistency check, the presence of pinned data in the primary storage.

3. The method of claim 1, the method further comprising:
    returning, in response to identifying the error on the primary storage, the error token.

4. The method of claim 1, the method further comprising:
    locking, in response to determining that the issued write command token and the error token match, the untrusted data set on the primary storage.

5. The method of claim 4, the method further comprising:
unlocking, in response to resolving the error associated with the error token, the untrusted data set.

6. The method of claim 1, the method further comprising:
determining that a prefix bit is set for a track which currently has no error and rejecting that write command.

7. A computer program product comprising a computer readable storage medium having program instructions embodied therewith, the program instructions executable by a processor to cause the processor to perform a method comprising:
monitoring a primary storage for one or more errors that indicate untrusted data on the primary storage;
identifying an error that indicates that a data set on a primary storage is an untrusted data set;
determining, in response to identifying the untrusted data set on the primary storage, that an issued write command token matches an error token identifying the error;
determining, in response to a prefix bit being set on the write, that the issued write command is intended to correct the error;
reading, in response to identifying the error indicating the untrusted data set on the primary storage, a corresponding uncompromised version of the data set from a secondary storage; and
writing the corresponding uncompromised version of the data set from the secondary storage over the untrusted data set in the primary storage.

8. The computer program product of claim 7, wherein identifying the error that indicates a data set on the primary storage is a pinned data set includes:
performing a consistency check operation on the primary storage; and
determining, in response to performing the consistency check, the presence of pinned data in the primary storage.

9. The computer program product of claim 7, wherein the method performed by the processor further comprises:
locking, in response to determining that the issued write command token and the error token match, the data set including the untrusted data set on the primary storage device.

10. The computer program product of claim 7, wherein the method performed by the processor further comprises:
returning, in response to identifying the error on the primary storage, the error token.

11. The computer program product of claim 9, wherein the method performed by the processor further comprises:
unlocking, in response to resolving the error associated with the error token, the untrusted data set.

12. A system comprising:
a memory; and
a processor communicatively coupled to the memory, wherein the processor is configured to perform a method comprising:
monitoring a primary storage for one or more errors that indicate untrusted data on the primary storage;
identifying an error that indicates that a data set on the primary storage is an untrusted data set;
determining, in response to identifying the untrusted data set on the primary storage, that an issued write command token matches an error token identifying the error;
determining, in response to a prefix bit being set on the write, that the issued write command is intended to correct the error;
reading, in response to identifying the error indicating the untrusted data set on the primary storage, a corresponding uncompromised version of the data set from a secondary storage; and
writing the corresponding uncompromised version of the data set from the secondary storage over the untrusted data set on the primary storage.

13. The system of claim 12, wherein identifying the error that indicates that the data set on the primary storage is the untrusted data set includes:
performing a consistency check operation on the primary storage; and
determining, in response to performing the consistency check, the presence of pinned data in the primary storage.

14. The system of claim 12, wherein the method performed by the processor further comprises:
returning, in response to identifying the error on the primary storage, the error token.

15. The system of claim 12, wherein the method performed by the processor further comprises:
locking, in response to determining that the issued write command token and the error token match, the untrusted data set on the primary storage.

16. The system of claim 15, wherein the method performed by the processor further comprises:
unlocking, in response to resolving the error associated with the error token, the untrusted data set.

* * * * *